(12) United States Patent
Clark

(10) Patent No.: US 7,371,034 B2
(45) Date of Patent: May 13, 2008

(54) DRILLING ATTACHMENT

(76) Inventor: John Clark, The Paddock, Rumblingbridge Rd., Muckhart, Clackmannanshire FK14 7JH (GB)

( * ) Notice: Subject to any disclaimer, the term of this patent is extended or adjusted under 35 U.S.C. 154(b) by 521 days.

(21) Appl. No.: 10/517,128

(22) PCT Filed: Jun. 6, 2003

(86) PCT No.: PCT/GB03/02488

§ 371 (c)(1),
(2), (4) Date: Jun. 6, 2005

(87) PCT Pub. No.: WO03/103888

PCT Pub. Date: Dec. 18, 2003

(65) Prior Publication Data

US 2005/0249561 A1    Nov. 10, 2005

(30) Foreign Application Priority Data

Jun. 6, 2002    (GB) .................................. 0213019.3

(51) Int. Cl.
*B23B 47/34* (2006.01)
*B23B 51/06* (2006.01)

(52) U.S. Cl. ............................ 408/68; 408/58; 408/59; 408/204; 408/207; 279/143; 173/73; 173/198

(58) Field of Classification Search ............ 408/56–61, 408/67, 68, 204, 207, 239 A; 279/143; 173/71, 173/73, 198

See application file for complete search history.

(56) References Cited

U.S. PATENT DOCUMENTS

| 2,349,156 | A | * | 5/1944 | Fischer ........................ 408/56 |
| 3,003,493 | A | * | 10/1961 | Miller .......................... 408/59 |
| 3,243,924 | A | * | 4/1966 | Peters ......................... 451/488 |
| 3,259,403 | A | * | 7/1966 | Hjalsten et al. .......... 285/121.3 |
| 3,791,660 | A | * | 2/1974 | Bostley ......................... 279/20 |
| 3,795,957 | A | * | 3/1974 | Steusloff .................... 29/90.01 |
| 4,036,308 | A |   | 7/1977 | Dellenberg |
| 4,168,753 | A |   | 9/1979 | Raibetanz et al. |
| 4,573,836 | A | * | 3/1986 | Andersson .................... 408/59 |
| 4,598,617 | A | * | 7/1986 | Kubo et al. .................... 82/158 |

(Continued)

FOREIGN PATENT DOCUMENTS

DE    30 49 268 A1    7/1982

(Continued)

*Primary Examiner*—Monica Carter
(74) *Attorney, Agent, or Firm*—Tarolli, Sundheim, Covell & Tummino LLP

(57) ABSTRACT

A drilling attachment for use in wet and dry drilling operations includes a housing having first and second fluid conduits, and a drive shaft mounted within the housing and having fluid transmitting first and second end portions in fluid communication with a respective first and second fluid conduit. In one embodiment, at any time one end of the drive shaft is coupled to a drive unit and the other end of the drive shaft is coupled to a core drill bit. In a dry drilling operation, dust is extracted from the core of the drill bit, is passed through the drive shaft and exits the housing via one of the fluid conduits. In a wet drilling operation, fluid such as water is passed through the other of the fluid conduits, through the drive shaft and into the core of the drill bit.

81 Claims, 17 Drawing Sheets

U.S. PATENT DOCUMENTS

| | | | |
|---|---|---|---|
| 4,643,621 A * | 2/1987 | Fuller et al. | 408/57 |
| 4,743,145 A * | 5/1988 | Hendricks et al. | 408/59 |
| 4,749,316 A * | 6/1988 | Hendricks | 408/239 R |
| 5,052,411 A * | 10/1991 | Schoolman | 128/863 |
| 5,092,716 A * | 3/1992 | Omi | 408/59 |
| 5,253,961 A | 10/1993 | Geissler | |
| 5,560,270 A * | 10/1996 | Caldana | 82/1.11 |
| 5,888,031 A | 3/1999 | Buck et al. | |
| 6,293,357 B1 * | 9/2001 | Patterson | 175/93 |
| 6,491,057 B1 * | 12/2002 | Collins | 137/318 |
| 6,533,047 B2 * | 3/2003 | Kleine et al. | 175/213 |
| 6,857,344 B1 * | 2/2005 | Diller | 82/1.2 |
| 7,144,207 B2 * | 12/2006 | Weigel | 408/56 |
| 2002/0119019 A1 * | 8/2002 | Hara | 409/131 |

FOREIGN PATENT DOCUMENTS

| | | |
|---|---|---|
| DE | 38 41 871 A1 | 6/1990 |
| DE | 297 24 568 U1 | 3/2002 |
| EP | 0 235 581 A1 | 9/1987 |
| EP | 0 691 484 A1 | 1/1996 |
| GB | 2 324 486 A | 10/1998 |
| JP | 2003 97178 A2 | 4/2003 |

* cited by examiner

DRILLING ATTACHMENT

The present invention relates to a drill attachment, and in particular, to a drill attachment for use in wet and dry drilling operations.

Drilling bores in walls and the like may be achieved using a suitable drill bit coupled to a drilling unit such as a domestic hand held drill or an industrial drill, for example. Where small diameter bores are required it is usually sufficient to use a solid drill bit. However, where larger diameter bores are required it is conventional to use a core drill bit which consists of a tubular member having a central bore and having cutting elements, such as diamond impregnated segments, mounted at the leading edge thereof.

In order to improve the quality of bores drilled with core drill bits, and to extend the useable life of the cutting elements, it is known to provide means for extracting the dust which is produced during a drilling operation from the central bore of the core bit. This prevents clogging of the hole being drilled, provides a cleaner working environment, provides additional cooling to the cutting elements, and ultimately improves the quality of bores which are produced, requiring little or no tidying or "making good".

Dust extraction, commonly referred to as dry drilling, may be achieved by coupling a vacuum or suction device to a special attachment mounted between the drill unit and the core bit. The special attachment allows for dust to be extracted from the bore of the core bit, into the adapter, and into a collection bag or the like associated with the vacuum or suction device.

Dust extraction is a practical method of improving drilling capabilities and efficiency. However, when drilling operations are required in particularly hard materials, such as granites, concretes, hard engineering and facing bricks, and clay materials and the like, dry drilling is often inefficient and in extreme cases, unachievable. In such situations it is known to inject a lubricating drilling fluid, such as water, into the area of drilling, a procedure commonly referred to as wet drilling. This reduces friction between the cutting elements and the material being drilled, cools the cutting elements and assists in controlling the drilling dust, which is forced out of the hole when drilling.

Wet drilling may be accomplished by placing a wet drilling attachment between the drill unit and the core bit, said wet drilling attachment being coupled to a fluid supply which passes through said unit and into the bore of the core drill bit.

A number of problems exist in currently known dry and wet drilling procedures. For example, each type of drilling generally requires a separate attachment to be coupled between the drilling unit and the core bit, which requires extra equipment to be stored and easily accessed on site. Furthermore, attachments which are capable for use in both dry and wet drilling operations are frequently limited in the maximum core bit diameter with which they may be used, particularly for wet drilling.

Additionally, current systems which utilise a combined dry and wet attachment are prone to clogging, as dust trapped therein from use in a dry drilling operation may become saturated during wet drilling if the unit is not properly cleaned after each type of use.

It is an object of at least one aspect of the present invention to obviate, or at least mitigate, the aforementioned problems in the prior art.

According to a first aspect of the present invention, there is provided a drill attachment for coupling a tubular cutting member having a bore to drive means for rotating the cutting member, the drill attachment comprising:

a housing defining first and second fluid conduits; and a drive shaft rotatably mounted within the housing and having fluid transmitting first and second end portions in fluid communication with the respective first and second fluid conduits, the first end portion being adapted for coupling to one of a tubular cutting member and a drive means and the second end portion being adapted for coupling to the other of the tubular cutting member and the drive means.

Preferably, at least one of said first and second end portions of the drive shaft is adapted for coupling to a tubular cutting member when dry drilling is required. Additionally, preferably at least one of said first and second end portions of the drive shaft is adapted for coupling to a tubular cutting member when wet drilling is required.

In a preferred embodiment of the present invention, one of said first and second end portions of the drive shaft is adapted for coupling to a tubular cutting member when dry drilling is required, and the other of said first and second end portions is adapted for coupling to a tubular cutting member when wet drilling is required.

Dry drilling, as noted herein, involves extracting dust produced during a drilling operation from the bore of the cutting member. Wet drilling, on the other hand, involves feeding a drilling fluid, such as water, into the bore of a tubular cutting member during drilling, which lubricates the material being drilled and cools the cutting member, improving drilling efficiency and increasing the useable life of the cutting member.

Conveniently, at least one of said first and second end portions of the drive shaft is adapted for transmitting dust extracted from the bore of a tubular cutting member, and at least one of said first and second end portions of the drive shaft is adapted for transmitting an appropriate drilling fluid such as water to the bore of a tubular cutting member.

Preferably, one of said first and second fluid transmitting end portions of the drive shaft is adapted for transmitting dust extracted from the bore of a tubular cutting member, and the other of said first and second end portions of the drive shaft is adapted for transmitting water or other appropriate drilling fluid to the bore of a tubular cutting member.

Conveniently, when dry drilling is required, a suction device, such as a vacuum pump or domestic or industrial vacuum cleaner, is coupled to one of the first and second fluid conduits in the housing. Alternatively, when wet drilling is required, a drilling fluid supply, such as a water supply is coupled to one of the fluid conduits in the housing. The drilling fluid may be pumped from a fluid reservoir or alternatively may be tapped from a mains supply.

Preferably, one of said first and second fluid conduits is adapted for coupling to a suction device or the like, and the other of said first and second fluid conduits is adapted for coupling to a fluid supply.

A suction device or a fluid supply or the like may be coupled to the required fluid conduit via an appropriate extraction or supply hose. Said supply or extraction hose may be connected to the first or second fluid conduit using a threaded connection or a jubilee clip or other suitable adjustable hose clip. Alternatively, any hose may be connected to the first or second fluid conduit by way of a nipple and sliding collar arrangement or other quick connect coupling. It should be noted that any connecting means may be used as would readily be selected by a person of skill in the art.

Thus, if dry drilling is required, a tubular cutting member is coupled to the end portion of the drive shaft adapted for transmitting dust from the bore of the tubular cutting member, the drive means is coupled to the other end portion thereof, and a vacuum pump or the like is connected to the first or second fluid conduit in fluid communication with the end portion of the drive shaft to which the cutting member is coupled. On the other hand, for wet drilling, the tubular cutting member and the drive means are coupled to the opposite end portions of the drive shaft from that required for dry drilling, and a drilling fluid supply is connected to the fluid conduit in fluid communication with the end portion of the drive shaft to which the cutting member is coupled. That is, the tubular cutting member is coupled to the end of the drive shaft adapted for transmitting an appropriate drilling fluid, and the drive means is coupled to the other end thereof.

Preferably, the drive shaft is bearing mounted within the housing of the drill attachment. Preferably also, the drive shaft is retained within said housing using circlips, for example. However, it should be noted that any means of retaining the drive shaft within the housing may be used as would readily be selected by a person of skill in the art.

Preferably, the drive shaft comprises a first axial bore which extends partially through the drive shaft from the first fluid transmitting end portion thereof, and terminates at a point within the drive shaft. Conveniently, the drive shaft comprises at least one radial bore which extends from the outer surface of the drive shaft and merges with said first axial bore. Preferably, said at least one radial bore merges with the first axial bore in the region of the terminating end of said first axial bore.

Advantageously, two radial bores are provided and are preferably diametrically aligned such that a first diametric bore is defined which extends through the drive shaft in a direction normal to the axial direction of the drive shaft.

Similarly, the drive shaft preferably comprises a second axial bore which extends partially through the drive shaft from the second fluid transmitting end portion thereof; and terminates at a point within the drive shaft. Preferably, the drive shaft further comprises at least one radial bore which extends from the outer surface of the drive shaft and merges with said second axial bore. Preferably, said at least one axial bore merges with the second axial bore in the region of the terminating end of said second axial bore.

Conveniently, two radial bores are provided and are preferably diametrically aligned such that a second diametric bore is defined which extends through the drive shaft in a direction normal to the axial direction of the drive shaft.

Preferably, the location of said radial bores along the length of the drive shaft is such that said bores are substantially aligned with a respective first and second fluid conduit in the housing. Thus, said first and second axial bores and respective radial bores permit fluid communication between the first end portion of the drive shaft and the first fluid conduit in the housing, and between the second end portion of the drive shaft and the second fluid conduit in the housing.

In a preferred embodiment of the present invention, one of said first and second axial bores and associated at least one radial bore in the drive shaft is adapted for transmitting dust from the bore of a cutting member to the respective fluid conduit in the housing. Preferably, the other of said first and second axial bores and associated at least one radial bore is adapted for transmitting a suitable drilling fluid from the respective fluid conduit in the housing to the bore of a cutting member.

Conveniently, the drive shaft comprises fluid seals located on either of the at least one radial bore through which drilling fluid may be supplied in order to prevent leakage of said drilling fluid.

Advantageously, one end of a tubular cutting member for use with the drill attachment comprises coupling means for coupling to the drive shaft, and another opposite end of the tubular cutting member comprises cutting elements for effecting drilling.

Preferably, the coupling means includes threaded coupling means, wherein, for example, the tubular cutting member may comprise a male threaded portion which is received within a female threaded portion provided on an end portion of the drive shaft. Alternatively, the cutting member may comprise a female threaded portion which receives a male threaded portion provided at an end portion of the drive shaft.

In a preferred embodiment, the drive shaft comprises means for preventing rotation within the housing when a tubular cutting member is coupled thereto using a threaded connection. Such rotation prevention means may be in the form of diametrically opposed land portions located at at least one end portion of the drive shaft, said land portions providing gripping means for a tool to restrain the drive shaft from rotational motion. The land portions may be adapted to be gripped by an open mouthed wrench or an adjustable pipe wrench, or the like.

Preferably also, the coupling means of the tubular cutting member is provided on a shank portion associated therewith. The shank portion may be formed integrally with the cutting member or may be independently coupled thereto, as discussed in more detail below.

The shank portion preferably includes a throughbore, permitting fluid transmission between the bore of the cutting member and one of the first and second fluid conduits in the housing when in use. Preferably, the arrangement is such that fluid transfer is possible through the throughbore in the shank portion, through one of the first and second axial bores and through a respective at least one radial bore associated therewith, and into the region of the respective first and second fluid conduits in the housing, and vice versa.

Conveniently, the drill attachment is for use with a selection of tubular cutting members having various bore diameters. For example, the drill attachment may be for use with cutting members having bore diameters of around 20 to 250 mm and above.

Preferably, large diameter tubular cutting members, particularly those for use in dry drilling operations, have a plurality of extraction apertures in the base thereof, adjacent to the coupling means, in order to accommodate larger dust extraction rates than are possible solely through the shank portion. Advantageously, tubular cutting members having a bore diameter greater than around 70 mm, and preferably greater than 80 mm, comprise dust extraction apertures in the base thereof.

In one embodiment, where large diameter tubular cutting members are used, an adapter may be provided which comprises the coupling means for coupling to the end portion of the drive shaft, upon which adapter the tubular cutting member is mounted. Preferably, the adapter comprises a plurality of radially extending mounting pins which are received within engaging slots provided in the tubular cutting member. This arrangement may be described as a bayonet type fitting.

The adapter may comprise a male threaded portion provided on a shank portion for coupling to the end of the drive shaft. Thus, as noted above, the shank portion may be indirectly coupled to the cutting member.

Preferably the shank portion includes a throughbore which permits fluid communication between the bore of the cutting member and one of the first and second fluid conduits in the housing, via the respective bores in the drive shaft.

Alternatively, the adapter may comprise a female threaded portion which couples to the end of the drive shaft, either directly, or indirectly using a double sided, male threaded, female-to-female thread adapter, for example.

Conveniently, tubular cutting members having a bore diameter greater than around 70 mm, and preferably greater than 80 mm are coupled to the drive shaft using an adapter.

Preferably, the adapter further comprises a plurality of extraction apertures through which dust may also be extracted from the bore of the cutting member.

Preferably also, where dust extraction is effected through extraction apertures, either in the base of a tubular cutting member or through an adapter as described above, the dust is drawn into a chamber in the housing and through one of the first and second fluid conduits.

The chamber is preferably an annular chamber defined between the outer surface of a portion of the drive shaft and the inner surface of a portion of the housing. Additionally, the chamber is preferably located within the region surrounding one of said first and second axial bores in the drive shaft. Preferably also, the chamber is open at one end providing an opening through which dust may be drawn into said chamber. Thus, this arrangement requires that only one side of the drilling attachment is adapted for dry drilling when large bore cutting members are used and dust is to be extracted through extraction apertures as well as through a shank portion used to couple the cutting member to the drive shaft. Preferably, the chamber is located at a first side of the drill attachment and is in fluid communication with the first fluid conduit in the housing.

The side of the drilling attachment comprising the chamber may also be used for wet drilling, wherein means are provided for closing the opening through which dust is extracted into the chamber during dry drilling. Such means may include an annular body mounted within the opening, which annular body comprises a plurality of apertures which remain open during dry drilling, but which are closed during wet drilling to prevent leakage of drilling fluid. The apertures may be selectively opened and closed by use of an annular plate mounted on or within said annular body, which annular plate has corresponding apertures which are aligned with those of the annular body during dust extraction, but which are misaligned with the apertures of the annular body, in order to close said apertures, during wet drilling. Preferably, a fluid sealing arrangement is provided between the annular body and annular plate in order to maintain sealing integrity and to prevent leakage of the drilling fluid.

Advantageously, the chamber is in selective fluid communication with one of the first and second fluid conduits in the housing, such that a fluid path between the chamber and said fluid conduit is open when dust is extracted through the extraction apertures; that is, when large diameter cutting members are used.

Selective fluid communication between the chamber and the fluid conduit may be achieved by use of a sliding collar provided on the housing, and preferably on the inner surface of the housing at the location of the chamber. The collar is preferably moveable in an axial direction from a first position where the fluid path is closed, to a second position where the fluid path is open.

Preferably, the drive shaft has an annular ring mounted on the outer surface thereof, said ring having substantially the same outer diameter as the inner diameter of the portion of the housing defining the chamber. Preferably, the ring is aligned with the fluid conduit in fluid communication with the chamber, and more preferably along the centre-line thereof. Thus, when the collar is moved to close the fluid path between the fluid conduit and the chamber, that is, towards a first position, a first end of the collar will abut a side face of the ring, therefore closing a portion of the fluid conduit and consequently said fluid path. Thus, any dust extracted from the bore of the cutting member will be drawn through the throughbore in the shank portion, through the respective bores in the drive shaft, and subsequently through the portion of the fluid conduit which remains open. In this position, a second end of the collar, opposite said first end, is substantially aligned with the opening of the chamber.

When large diameter cutting members are used in dry drilling operations where dust is extracted through the shank portion and extraction apertures, the collar is extended from the housing towards the second, open position, towards the base of the cutting member, wherein the second end of the collar is substantially aligned with the base of the cutting member. This, therefore, opens the fluid path between the chamber and the associated fluid conduit and also provides an enclosed path through which dust may be extracted from the bore of the cutting member, through the extraction apertures and into the chamber within the housing, substantially minimising the leakage of dust particles into the atmosphere.

Conversely, when small diameter cutting members are used in dry drilling operations where dust is extracted through the throughbore in the shank portion only, the collar is retracted into the housing towards the first position, closing the fluid path between the chamber and the associated fluid conduit. When the drill attachment is in use, closing said fluid path will prevent re-circulation of extracted dust into the chamber and prevent any reduction in the extraction flow rate provided by a suction device attached to said fluid conduit associated with said chamber.

Advantageously, the collar comprises a plurality of axially arranged circumferential depressions in the outer surface thereof, said depressions adapted to receive an inwardly extending lip provided on the housing. In use, the interaction of the circumferential depressions and the lip is to retain the collar in the desired position such that the collar cannot inadvertently be pushed into or pulled from the housing during a drilling operation, at least not without considerable force being applied.

In an alternative, preferred embodiment, the collar includes a plurality of longitudinal ribs circumferentially distributed about the outer surface of the collar, said ribs defining a number of depressions adapted to receive an inwardly extending lip provided on the housing.

Preferably, tubular cutting members used with the drill attachment may be used in both wet and dry drilling operations. However, large diameter tubular cutting members having extraction apertures in the base thereof preferably comprise means for blocking said apertures in order to prevent drilling fluid from pouring from the bore of the cutting member. Such blocking means may include, for example, plugs which are fitted within the apertures, or may alternatively include a plate rotatably mounted on the cutting member or appropriate adapter, said plate being rotatable to selectively open and close the extract apertures.

Preferably, the blocking means includes a unitary component having a plurality of plugs each formed and arranged to be received within a respective extraction aperture. Advantageously, adjacent plugs of the unitary component may be joined together by a linking member or connecting rib. Conveniently, the linking members may serve to provide a means for removing the plugs of the unitary component from the extraction apertures. For example, the linking members may be adapted to be gripped by the hand or gripped or levered with a tool such as a gripping wrench or a screwdriver or the like.

In some circumstances, where it is required to drill into relatively thick walls or the like, an extension portion may be used. Said extension portion may comprise an elongate tubular member having a throughbore and including threaded portions at either end thereof for coupling to the drive shaft and a tubular cutting member or appropriate cutting member adapter. Thus, a fluid path will exist between the bore of the cutting member and one of the first and second fluid conduits in the housing via the throughbore of the extension portion and the respective bores of the drive shaft.

Preferably, where large diameter cutting members are used in dry drilling operations and dust is to be extracted through extraction apertures, an additional tubular member is provided which surrounds the extension portion and provides an encased path for dust to be drawn from the bore of the cutting member and into the chamber of the drill attachment housing. The additional tubular member may be coupled to the drill attachment via an appropriate adapter, and preferably via a similar adapter to that used for large diameter cutting members, as discussed above.

Advantageously, means are provided to secure a pilot drill to the drill attachment. Such means may be provided on the drive shaft at at least one end portion thereof. The pilot drill securing means may comprise at least one grub screw which extends radially through the drive shaft and grips a pilot drill located within one of the first and second axial bores. Where the at least one grub screw extends through the drive shaft at a portion of the shaft which is contained within the housing, access to said at least one grub screw may be achieved through one of the first and second fluid conduits in the housing of the drill attachment.

Preferably, the drive means is a drilling unit such as a hand held electric drill, pneumatic drill or hydraulic drill or the like.

The drive means may be coupled to the drive shaft by threaded coupling means, for example. Preferably, the drive means comprises a male threaded portion which engages a female threaded portion provided on the drive shaft.

Alternatively, the drive means may be coupled to the drive shaft via an adapter, one end of which adapter may comprise a male threaded portion for coupling to the drive shaft, and the opposite end may comprise a pin adapted to be received in a chuck of the drive means, such as a three jaw Jacobs chuck or an SDS chuck, for example.

Applicant has conveniently termed the drill attachment of the present invention "MULTISWIVEL" (Trade Mark).

According to a second aspect of the present invention, there is provided a drill attachment for coupling a tubular cutting member having a bore to drive means for rotating the cutting member, said drill attachment comprising:

a housing defining a fluid conduit; and a drive shaft rotatably mounted within the housing and having a fluid transmitting end portion being in fluid communication with the fluid conduit and being adapted for coupling to a tubular cutting member, and a drive end portion being adapted for coupling to drive means, said housing and said drive shaft together defining a chamber having an opening in selective fluid communication with said fluid conduit.

Preferably, the opening of the chamber in selective fluid communication with fluid conduit is located at the end thereof adjacent the fluid transmitting end portion of the drive shaft.

Preferably also, the fluid transmitting end portion of the drive shaft is in fluid communication with the fluid conduit via the chamber defined by the drive shaft and the housing.

Preferably, the chamber defined by the housing and the drive shaft is an annular chamber.

Advantageously, the drill attachment is adapted for use in both dry and wet drilling operations. Dry drilling, as noted herein, involves extracting dust produced during a drilling operation from the bore of the cutting member. Wet drilling involves feeding a drilling fluid, such as water, into the bore of the tubular cutting member during drilling, which lubricates the material being drilled and cools the cutting member, improving the drilling efficiency and increasing the useable life of the cutting member.

Conveniently, the fluid transmitting end portion of the drive shaft is adapted for transmitting drilling fluid to the bore of a tubular cutting member.

Additionally, the fluid transmitting end portion of the drive shaft may be adapted for transmitting dust extracted from the bore of a cutting member.

Preferably, the opening in the fluid chamber is adapted for transmitting dust extracted from the bore of a tubular cutting member.

Conveniently, when dry drilling is required, a suction device such as a vacuum pump or domestic or industrial vacuum cleaner, is coupled to the fluid conduit in the housing. Alternatively, when wet drilling is required, a drilling fluid supply, such as a water supply, is coupled to the fluid conduit defined by the housing.

A suction device or a fluid supply may be coupled to the fluid conduit via an appropriate extraction or supply hose, which extraction or supply hose may be connected to the fluid conduit using a threaded connection or a jubilee clip or other suitable adjustable hose clip or the like. Alternatively, any hose may be connected to the fluid conduit by way of a nipple and sliding collar arrangement or any other quick connect coupling. However, it should be understood that any means of connecting a hose to the fluid conduit may be used as would readily be selected by a person of skill in the art.

Preferably, the drive shaft is bearing mounted within the housing of the drill attachment. Preferably also, the drive shaft is retained within said housing using circlips.

In a preferred embodiment of the present invention, the drive shaft comprises an axial bore which extends partially through the drive shaft from the fluid transmitting end portion thereof, and terminates at a point within the drive shaft. Conveniently, the drive shaft comprises at least one radial bore which extends from the outer surface of the drive shaft and merges with said axial bore.

Advantageously, two radial bores are provided and are preferably diametrically aligned such that a first diametric bore is defined which extends through the drive shaft in a direction normal to the axial direction of the drive shaft.

In an alternative embodiment, a number of radial bores are provided which are arranged to define a plurality of diametric bores distributed along the length of the drive shaft.

Conveniently, the axial bore and said at least one radial bore permit fluid communication between the fluid transmitting end portion of the drive shaft and the fluid conduit, via said chamber.

In a preferred embodiment, said axial bore and at least one radial bore are adapted for jointly transmitting dust from the bore of a tubular cutting member to the fluid conduit in the housing. Additionally, said axial bore and at least one radial bore are preferably adapted for jointly transmitting drilling fluid from the fluid conduit to the bore of a cutting member.

Advantageously, one end of a tubular cutting member for use with the drill attachment comprises coupling means for coupling to the drive shaft, and another, opposite end of the tubular cutting member comprises cutting elements for effecting drilling.

Preferably, the cutting means includes threaded coupling means, wherein, for example, the tubular cutting member may comprise a male threaded portion which is received within a female threaded portion provided on the fluid transmitting end portion of the drive shaft. Alternatively, the cutting member may comprise a female threaded portion which receives a male threaded portion provided on the fluid transmitting end of the drive shaft.

In a preferred embodiment, the drive shaft comprises means for preventing rotation within the housing when a tubular cutting member is coupled thereto using a threaded connection. Such rotation prevention means may be in the form of diametrically opposed land portions located on at least one of the fluid transmitting end and drive end of the drive shaft, said land portions providing gripping means for a tool to restrain the drive shaft from rotational motion. The land portions may be adapted to be gripped by an open mouthed wrench or an adjustable pipe wrench, or the like.

Conveniently, the coupling means of the tubular cutting member is provided on a shank portion associated therewith. The shank portion may be formed integrally with the cutting member or may be independently coupled thereto, as discussed in more detail below.

The shank portion preferably includes a throughbore, permitting fluid communication between the bore of the cutting member and the fluid conduit in the housing. preferably, the arrangement is such that fluid transfer is possible through the throughbore in the shank portion, through the axial and at least one radial bores in the drive shaft, through the chamber defined by the drive shaft and the housing, and through the fluid conduit, and vice versa.

Conveniently, the drill attachment is for use with a selection of tubular cutting members having various bore diameters. For example, the drill attachment may be for use with cutting members having bore diameters of around 20 to 250 mm and above.

Preferably, large diameter tubular cutting members, particularly those for use in dry drilling operations, have a plurality of extraction apertures in the base thereof, adjacent to the coupling means, in order to accommodate larger dust extraction rates than are possible solely through the shank portion. Advantageously, tubular cutting members having a bore diameter greater than around 70 mm, and preferably greater than 80 mm, comprise dust extraction apertures in the base thereof.

In one embodiment, where large diameter tubular cutting members are used, an adapter may be provided which comprises the coupling means for coupling to the fluid transmitting end portion of the drive shaft, upon which adapter the tubular cutting member is mounted. Preferably, the adapter comprises a plurality of radially extending mounting pins which are received within engaging slots provided in the tubular cutting member. This arrangement may be described as a bayonet type fitting.

The adapter may comprise a male threaded portion provided on a shank portion for coupling to the end of the drive shaft. Thus, as noted above, the shank portion may be indirectly coupled to the cutting member. Preferably, the shank portion includes a throughbore which permits fluid communication between the bore of the cutting member and the fluid conduit in the housing, via the bores in the drive shaft and via the chamber defined by the drive shaft and the housing.

Alternatively., the adapter may comprise a female threaded portion which couples to the fluid transmitting end of the drive shaft, either directly, or indirectly using a double sided, male threaded, female-to-female thread adapter, for example.

Conveniently, tubular cutting members having a bore diameter greater than 80 mm are coupled to the drive shaft using an adapter.

Preferably, the adapter further comprises a plurality of extraction apertures through which dust may be extracted from the bore of the cutting member.

Preferably, where dust extraction is effected through extraction apertures, either in the base of a tubular cutting member or through an adapter as described above, the dust is drawn into the chamber via the opening thereof, which is selected to be in fluid communication with the fluid conduit.

To assist in dust extraction through extraction apertures in the base of a tubular cutting member, the housing may comprise a sliding collar, which collar may be extended from the housing towards the base of a tubular cutting member coupled to the drill attachment in order to provide an encased fluid path between the extract apertures and the opening of the chamber.

Alternatively, the arrangement may be such that when a cutting member is coupled to the drill attachment, the base of the cutting member is sufficiently close to the opening in the chamber to eliminate the requirement for a sliding collar, as noted above.

In a preferred embodiment, where large bore tubular cutting members are used in dry drilling operations, dust is extracted from the bore of the cutting member through the throughbore of the shank portion and into the chamber via the bores of the drive shaft and additionally through the extract apertures in the base of the cutting member and into the chamber via the opening thereof.

Preferably, when small bore cutting members are used in dry drilling operations, dust is extracted through the throughbore of the shank portion, through the bores of the drive shaft, into the chamber, and through the fluid conduit defined in the housing. In this arrangement, the opening of the chamber is selected to prevent any fluid communication between the opening and the fluid conduit in order to prevent dust escaping from the chamber and into the atmosphere.

When wet drilling is undertaken using large bore cutting members, drilling fluid is preferably transferred to the bore thereof through the fluid conduit into the chamber, through the bores of the drive shaft and through the throughbore in the shank portion. Preferably, the opening of the chamber is selected to prevent any fluid communication between said opening and the fluid conduit in order to prevent spillage of the drilling fluid from the chamber.

Conveniently, selective fluid communication between the opening of the chamber and the fluid conduit may be achieved by way of an annular body mounted within the opening of the chamber, which annular body comprises a plurality of apertures which may be selectively opened and closed by use of an annular plate mounted on or within said annular body. Preferably, said annular plate has corresponding apertures which are aligned with those of the annular body to provide fluid communication between the opening of the annulus and the fluid conduit, but which are misaligned with the apertures of the annular body in order to close said apertures, and thus prevent fluid communication. Preferably, a fluid sealing arrangement is provided between the annular body and annular plate in order to maintain sealing integrity and to prevent leakage of the drilling fluid.

Preferably, tubular cutting members used with the drill attachment may be used in both wet and dry drilling operations. However, large diameter tubular cutting members having extraction apertures in the base thereof preferably comprise means for blocking said apertures in order to prevent drilling fluid from pouring from the bore of the cutting member when used in wet drilling operations. Such blocking means may include, for example, plugs which are fitted within the extraction apertures, or may alternatively include a plate rotatably mounted on the cutting member or appropriate adapter, said plate being rotatable to selectively open and close the extraction apertures.

Preferably, the blocking means includes a unitary component having a plurality of plugs each formed and arranged to be received within a respective extraction aperture. Advantageously, adjacent plugs of the unitary component may be joined together by a linking member or connecting rib. Conveniently, the linking members may serve to provide a means for removing the plugs of the unitary component from the extraction apertures. For example, the linking members may be adapted to be gripped by the hand or gripped or levered with a tool such as a gripping wrench or a screwdriver or the like.

In some circumstances, where it is required to drill into relatively thick walls or the like, an extension portion may be used. Said extension portion may comprise an elongate tubular member having a throughbore and including threaded portions at either end thereof for coupling to the drive shaft and a tubular cutting member or appropriate cutting member adapter. Thus, a fluid path will exist between the bore of the cutting member and the fluid conduit defined in the housing via the throughbore of the extension portion and the bores of the drive shaft.

Preferably, where large diameter cutting members are used in dry drilling operations and dust is to be extracted through extraction apertures, an additional tubular member is provided which surrounds the extension portion and provides an encased path for dust to be drawn from the bore of the cutting member and into the chamber in the drill attachment housing. The additional tubular member may be coupled to the drill attachment via an appropriate adapter, and preferably via a similar adapter to that used for large diameter cutting members, as discussed above.

Advantageously, means are provided to secure a pilot drill to the drill attachment. Such means may be provided on the drive shaft at at least one end portion thereof. The pilot drill securing means may comprise at least one grub screw which extends radially through the drive shaft and grips a pilot drill located within one of the first and second axial bores. Where the at least one grub screw extends through the drive shaft at a portion of the shaft which is contained within the housing, access to said at least one grub screw may be achieved through one of the first and second fluid conduits in the housing of the drill attachment.

Preferably, the drive means is a drilling unit such as a hand held electric drill, pneumatic drill or hydraulic drill or the like.

The drive means may be coupled to the drive shaft by threaded coupling means, for example. Preferably, the drive means comprises a male threaded portion which engages a female threaded portion provided on the drive shaft.

Alternatively, the drive means may be coupled to the drive shaft via an adapter, one end of which adapter may comprise a male threaded portion for coupling to the drive shaft, and the opposite end may comprise a pin adapted to be received in a chuck of the drive means, such as a three jaw Jacobs chuck or an SDS chuck, for example.

These and other aspects of the present invention will now be described, by way of example, with reference to the accompanying drawings, in which.

Figure 1:
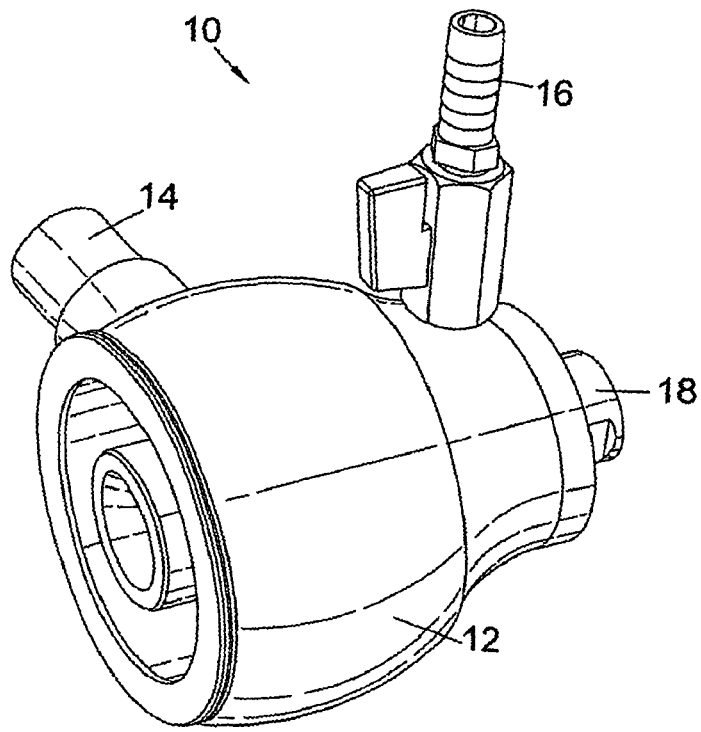
FIG. 1 is perspective view of a drill attachment for use in wet and dry drilling operations in accordance with one embodiment of one aspect of the present invention.
Figure 2:
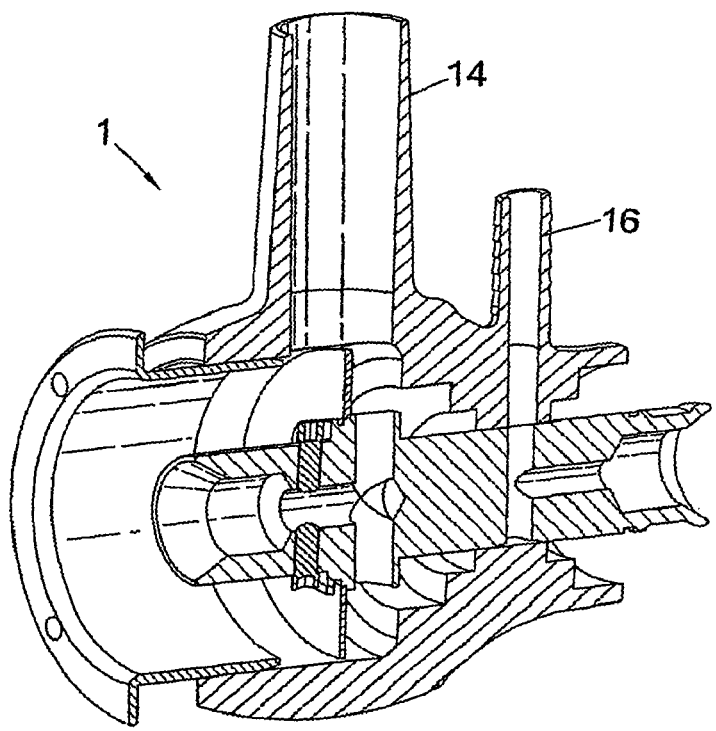
FIG. 2 is a sectional perspective view of a drill attachment in accordance with another embodiment of the present invention.

Reference is first made to FIG. 1 in which there is shown a perspective view of a drill attachment 10 for use in dry and wet drilling operations. The drill attachment comprises a housing 12 having a first fluid conduit 14 adapted for connecting to a suction device (not shown) and a second fluid conduit 16 adapted for connecting to a fluid supply (not shown). The drill attachment also comprises a drive shaft 18 rotatably mounted within the housing 12, the drive shaft being adapted for transmitting rotary motion from a drill unit to a tubular cutting member. As shown in FIG. 1, the first and second fluid conduits 14, 16 are disposed at 90° to each other. However, in alternative embodiments, the first and second fluid conduits may be disposed at any relative angle, such as is shown in FIG. 2 which is a cross-sectional view of a drill attachment 1 with the first and second fluid conduits 14, 16 being aligned in the same plane.

Figure 3:
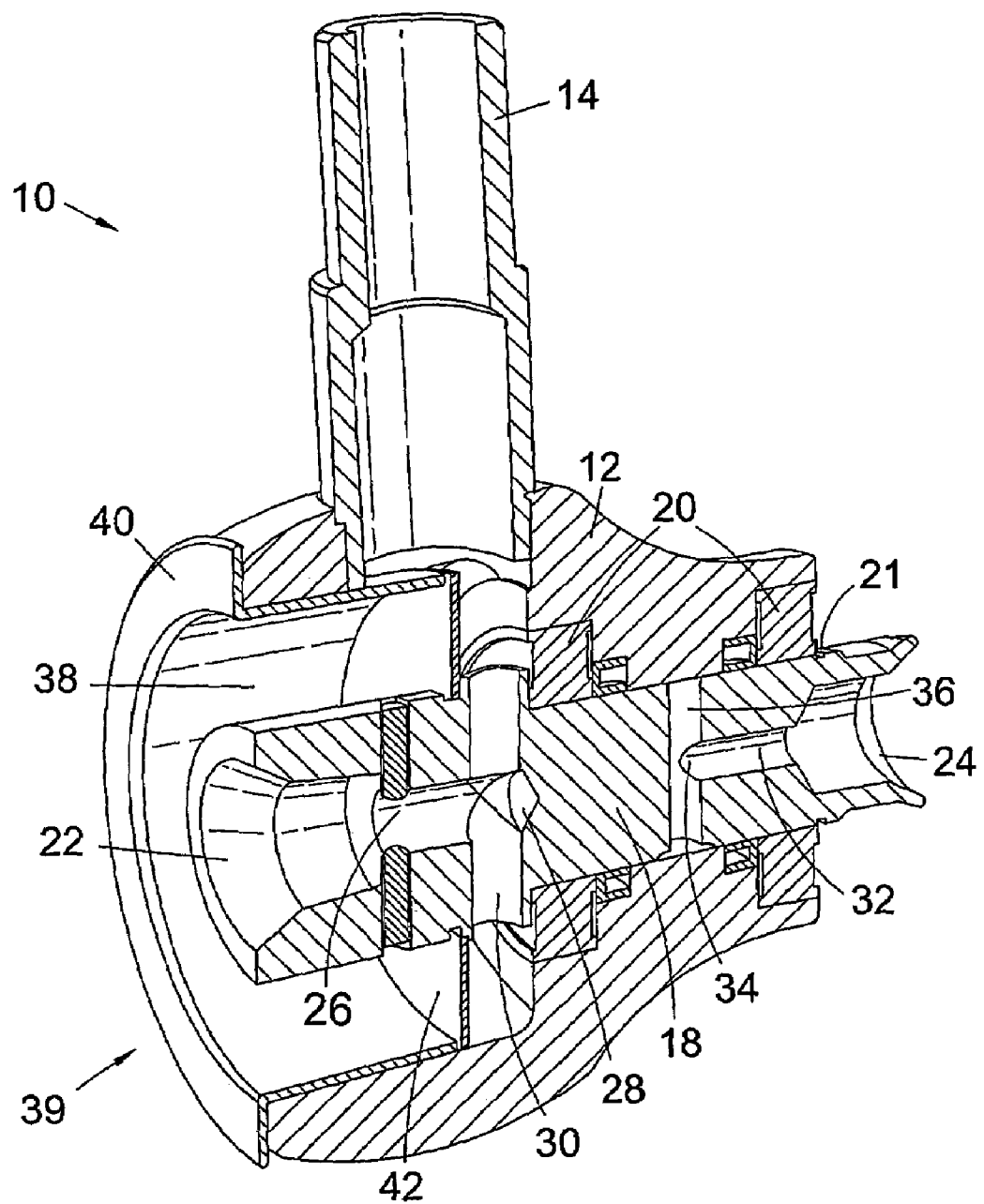
FIG. 3 is a sectional perspective view of the drill attachment of FIG. 1.

Reference is now made to FIG. 3 in which there is shown a sectional perspective view of the drill attachment 10 shown in FIG. 1. As noted above, the drill attachment 10 comprises a housing 12 within which a drive shaft 18 is rotatably mounted via bearings 20. The drive shaft 18 is retained within the housing 12 of the drill attachment via a circlip 21. The drive shaft 18 has fluid transmitting first and second ends 22, 24 which are in fluid communication with the respective first and second fluid conduits 14, 16, said first end 22 being adapted for coupling to one of a tubular cutting member and a drive means such as a drill unit and the second end 24 being adapted for coupling to the other of the tubular cutting member and the drive means.

The drive shaft 18 comprises a first axial bore 26 which extends partially through the drive shaft from the first end 22 thereof, and terminates at a point 28 within the drive shaft. The drive shaft additionally comprises a first diametric bore 30 which extends through the drive shaft and merges with the first axial bore 26 in the region of the terminating end 28 of the first axial bore. Thus, fluid communication between the first end 22 of the drive shaft 18 and the first fluid conduit 14 is achieved via the first axial and diametric bores 26, 30 in the drive shaft 18.

Similarly, the drive shaft 18 also comprises a second axial bore 32 which extends from the second end 24 thereof, and terminates at a point 34 within the drive shaft. Also provided is a second diametric bore 36 which extends through the drive shaft 18 and merges with the terminating end 34 of the second axial bore 32. Accordingly, fluid communication between the second end 24 of the drive shaft 18 and the second fluid conduit 16 (FIG. 1) is achieved via the second axial and diametric bores 32, 36 in the drive shaft.

The drill attachment 10 shown in FIG. 3 also comprises an annular chamber 38 which is open at one end 39, which chamber 38 is in selective fluid communication with the first fluid conduit 14 by way of a collar 40 slidably mounted on the inner surface of the housing 12.

The collar 40 is moveable in an axial direction from a first position, as shown in FIG. 3, where a fluid path between the chamber and the first fluid conduit 14 is closed, and a second position where a fluid path is opened. When the collar 40 is located in a first position, the end of the collar 40 abuts a side face of a ring 42 mounted on the drive shaft.

The chamber 38 is used for dust extraction when larger diameter tubular cutting members are used, wherein the collar 40 is moved to a second position to open a fluid path between the chamber 38 and the first fluid conduit 14, allowing dust to be extracted from the bore of a tubular cutting member, into the chamber 38 via annular opening 39, and through the first fluid conduit 14. The use of the chamber 38 for dust extraction with larger diameter cutting members will be discussed in more detail below.

Figure 4:
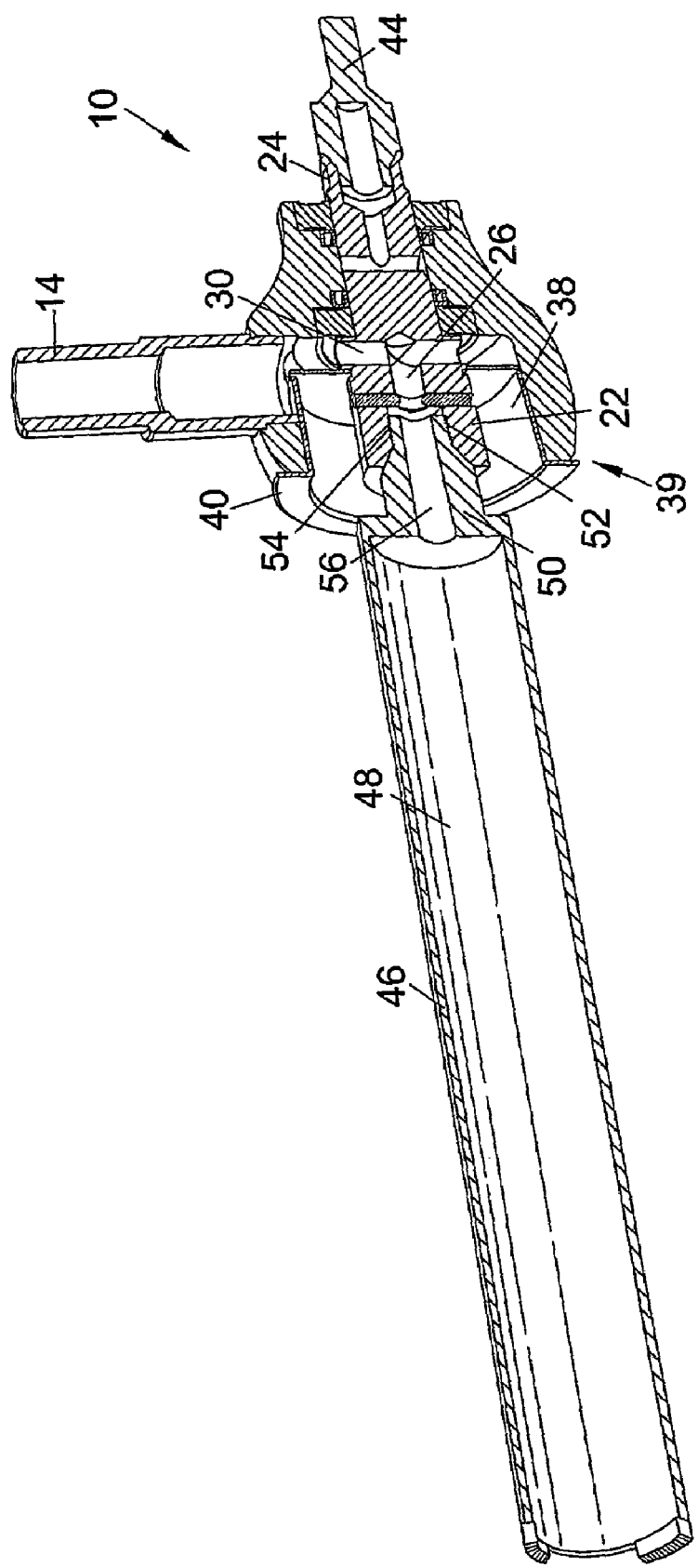
FIG. 4 is a sectional perspective view of the drill attachment of FIG. 1 used in a dry drilling operation.

As shown in FIG. 4, when a drilling operation is required to be undertaken with dust extraction, a drill unit (not shown) is coupled to the second end 24 of the drive shaft 18 via an adapter 44, a tubular cutting member 46 is coupled to the first end 22 of the drive shaft 18, and a suction device (not shown) is connected to the first fluid conduit 14. In the embodiment shown, the cutting member 46 is coupled to the first end 22 of the drive shaft 18 via a shank portion 50 which comprises a male threaded portion 52 which is received within a female threaded portion 54 provided in the first end 22 of the drive shaft 18. As shown, the shank portion 50 is formed integrally with the tubular cutting member 46 and comprises a throughbore 56. Thus, dust produced while drilling may be extracted from the bore 48 of a cutting member, through the throughbore 56 in the shank portion 50, through the bores 26, 30 in the drive shaft 18, and through the first fluid conduit 14.

When dust extraction is undertaken using a smaller diameter cutting member 46 as shown in FIG. 4, the collar 40 is located in its first position in order to close a fluid path between the annulus 38 and the first fluid conduit 14 in order to prevent extracted dust to escape into the atmosphere through the annular opening 39.

Figure 5:
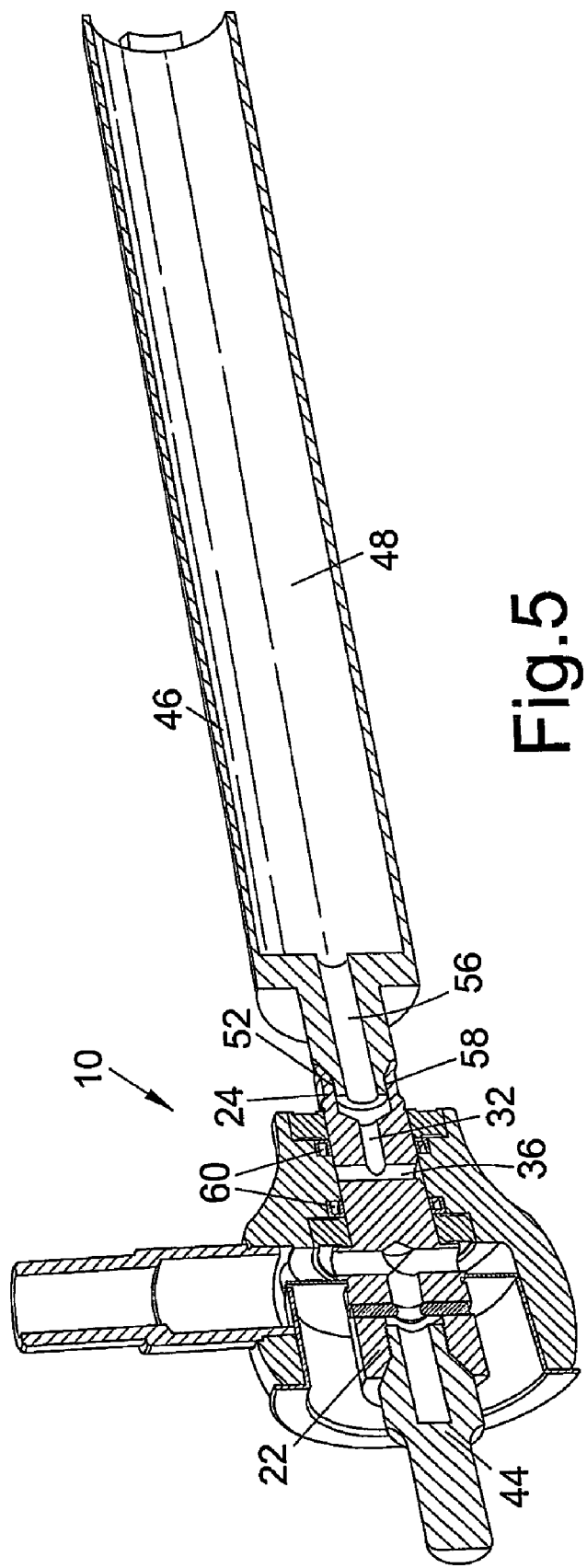
FIG. 5 is a sectional perspective view of the drill attachment of FIG. 1 used in a wet drilling operation.

A wet drilling arrangement will now be described with reference to FIG. 5 in which there is shown a further sectional perspective view of the drill attachment 10. Where a wet drilling operation is required to be undertaken, the drill unit (not shown) is coupled to the first end 24 of the drive shaft via an adapter 44 and the tubular cutting member 46 is coupled to the second end 24, wherein the male threaded portion 52 on the shank portion 50 is received within a female threaded portion 58 provided in the second end 24 of the drive shaft. A drilling fluid supply, such as a water supply, is coupled to the second fluid conduit 16 (FIG. 1) and fluid is transmitted through the second fluid conduit 16, through the bores 32, 36 in the drive shaft 18, through the throughbore 56 of the shank portion 50, and into the bore 48 of the tubular cutting member 46.

In order to prevent leakage of drilling fluid from the drill attachment 10, fluid seals 60 are provided on either side of the second diametric bore 36 of the drive shaft.

Figure 6:
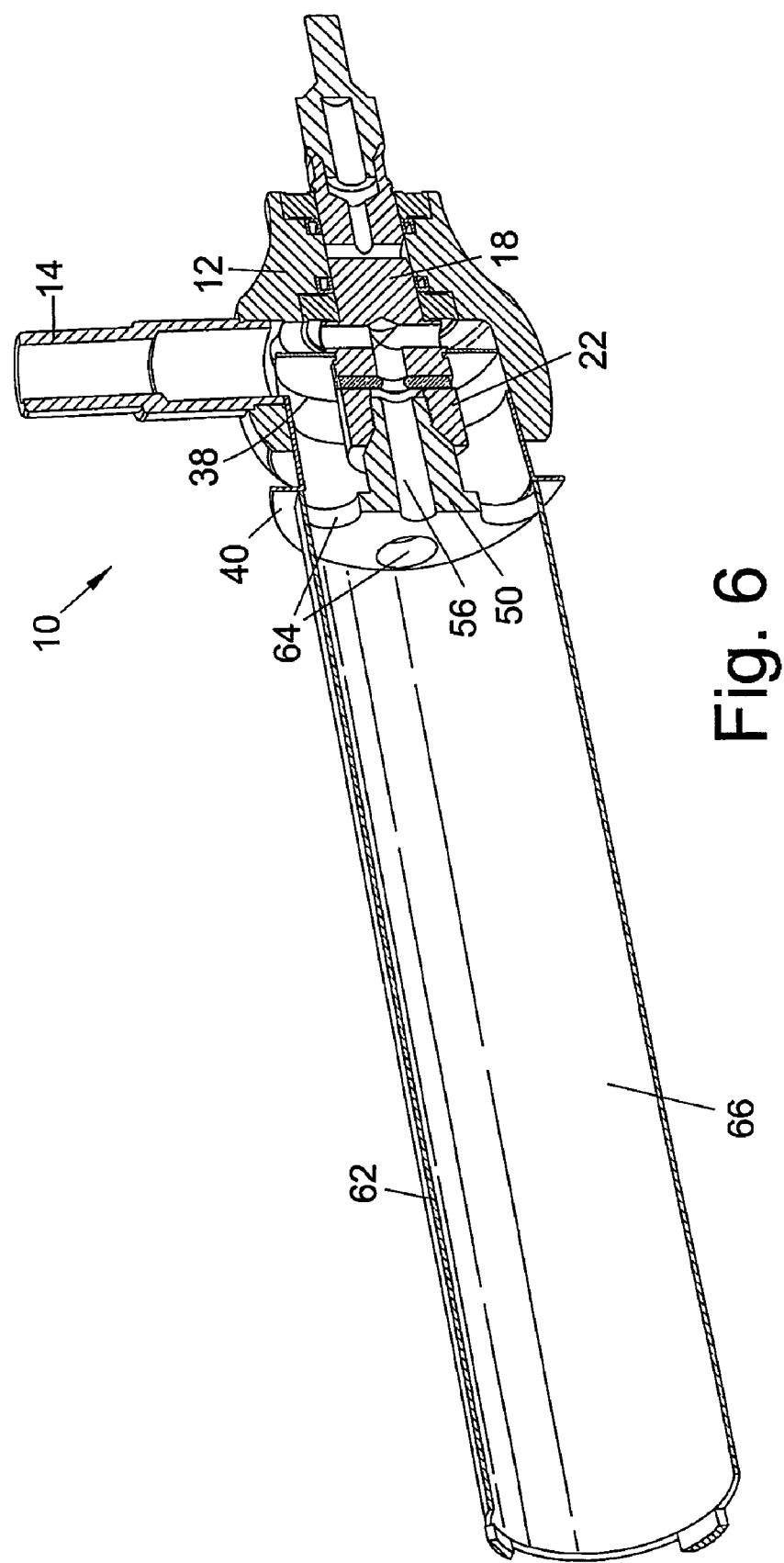
FIGS. 6 to 9 show sectional perspective views of the drill attachment of FIG. 1 in alternative dry drilling arrangements.

Reference is now made to FIG. 6 in which there is shown a sectional perspective view of the drill attachment 10 when used in a dry drilling operation with a larger diameter tubular cutting member 62. As before the cutting member 62 is coupled to the first end 22 of the drive shaft 18 via a shank portion 50 having a throughbore 56. In this instance, the tubular cutting member 62 comprises a plurality of extraction apertures 64 in the base thereof, through which extraction apertures 64 dust may additionally be extracted from the bore 66 of the cutting member 62.

In the same way as discussed above, a suction device (not shown) is connected to the first fluid conduit 14 and dust is extracted from the bore 66 of the cutting member 62 through the throughbore 56 in the shank portion 50, through the bores 26, 30 in the drive shaft 18, and through the first fluid conduit 14. However, dust is also extracted through the fluid conduit 14 via the chamber 38. This is achieved by extending the collar 40 from the housing 12 towards the base of the cutting member 62 such that the collar 40 is located in a second position wherein a fluid path between the chamber 38 and the first fluid conduit 14 is opened. When extended, the collar provides an encased path through which dust extracted through the extraction apertures 64 in the base of the cutting member 62 may pass into the chamber 38, substantially minimising the leakage of dust particles into the atmosphere.

Figure 7:
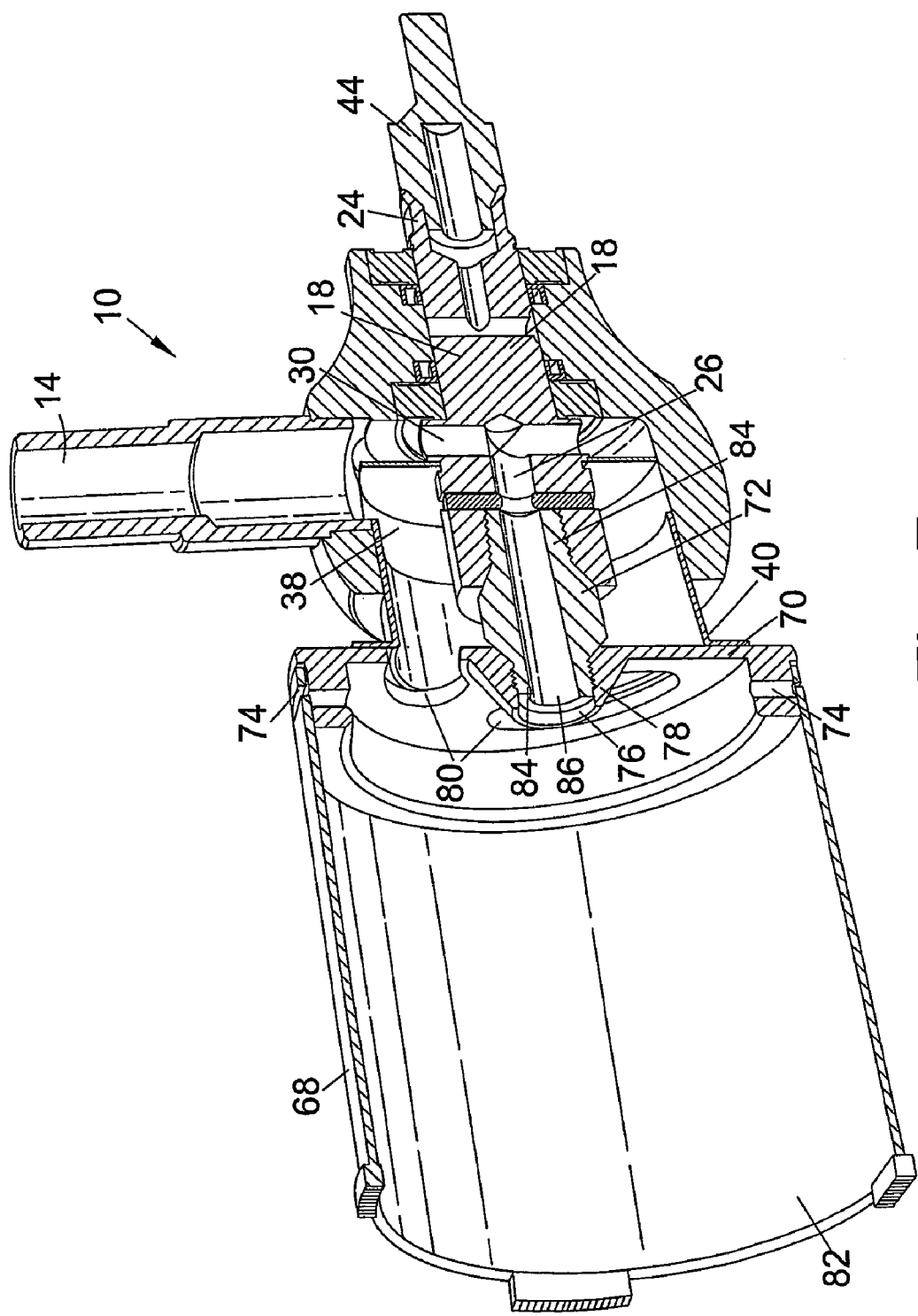

An alternative arrangement is shown in FIG. 7 of the drawings wherein the drill attachment 10 is shown in a dry drilling arrangement with a large diameter cutting member 68 coupled thereto. The cutting member 68 is coupled to the first end 22 of the drive shaft 18 via two adapters, a cutting member adapter 70 and a coupling adapter 72. The cutting member 68 is mounted on the cutting member adapter 70 via a bayonet type fitting 74, and the cutting member adapter 70 is coupled to the drive shaft 18 via the coupling adapter 72.

As shown in FIG. 7, the cutting member adapter 70 comprises a central bore 76 having a female threaded portion 78 for coupling to the coupling adapter 72. Additionally, the cutting member adapter 70 comprises a plurality of extract apertures 80 through which dust may be extracted from the bore 82 of the cutting member 68.

The coupling member 72 comprises a male threaded portion 84 on either end thereof, the male threaded portions 84 for coupling to the female threaded portion 78 in the cutting member adapter 70 and the female threaded portion 54 in the first end 22 of the drive shaft 18. Additionally, the coupling adapter 72 comprises a throughbore 86 through which dust may be transmitted from the bore 82 of the cutting member 68 to the first fluid conduit 14 via the bores 26, 30 in the drive shaft 18.

In use, a suction device (not shown) is connected to the first fluid conduit 14 and the collar 40 is moved towards the cutting member. adapter 70 in order to open the fluid path between the fluid conduit 14 and the chamber 38 and to provide an encased path through which dust extracted from the bore 82 of the cutting member 68 via the extraction apertures 80 may pass. Additionally, a drive unit (not shown) is coupled to the second end 24 of the drive shaft via adapter 44.

Figure 8:
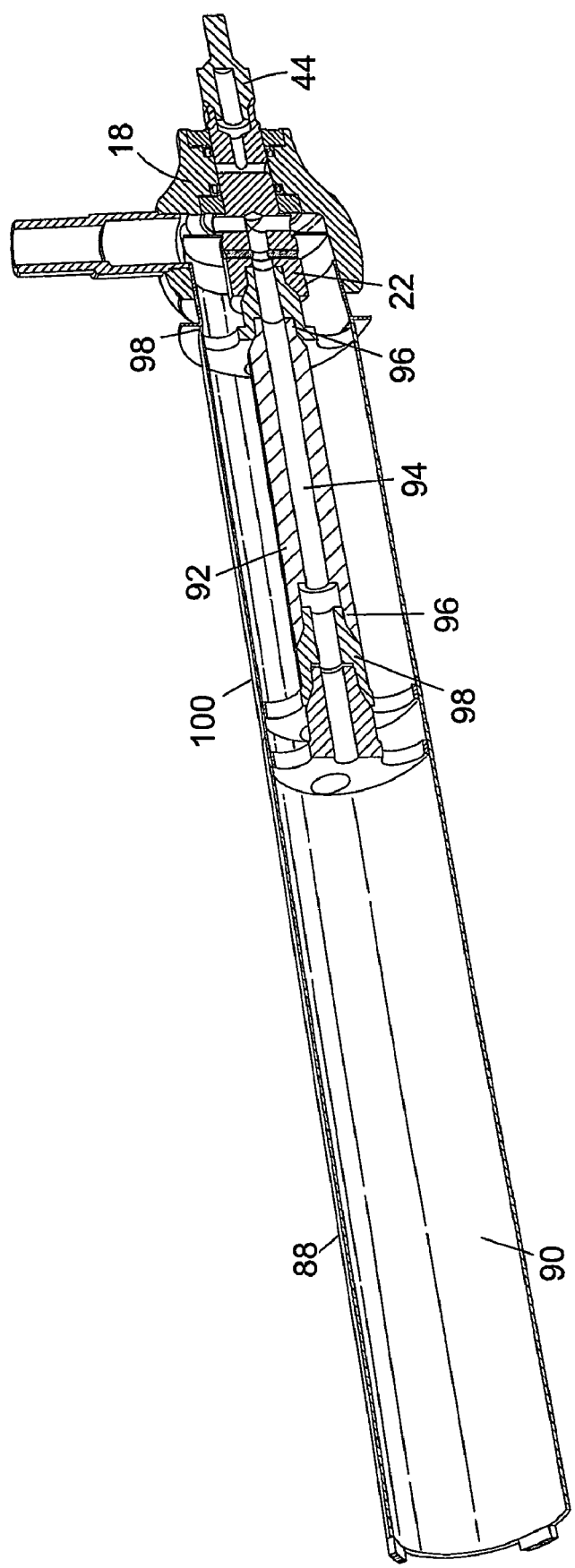
Figure 9:
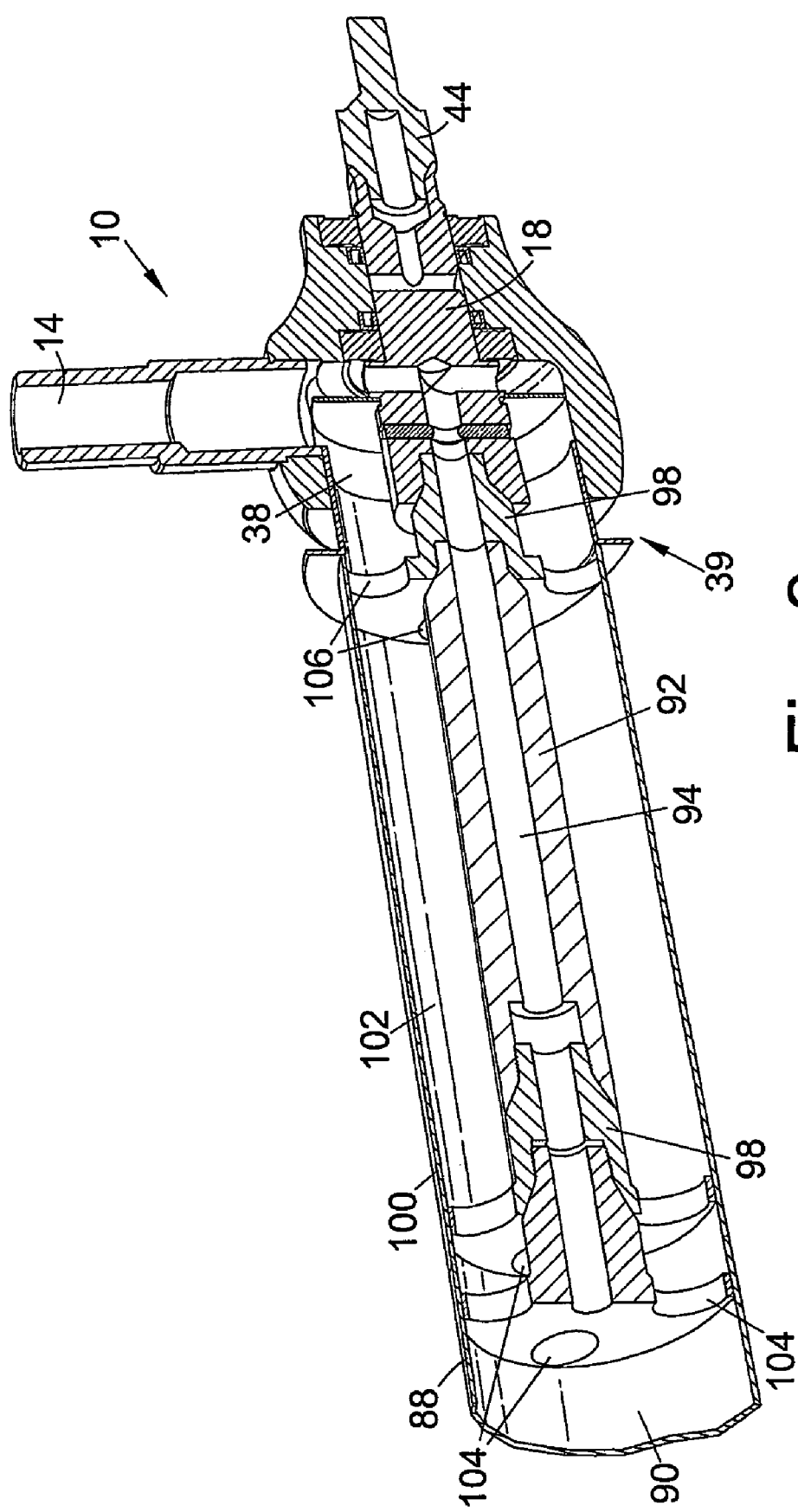

Reference is now made to FIG. 8 in which there is shown an arrangement of the present invention for use in drilling into relatively thick walls or the like when dust extraction is required. A cutting member 88 having a bore 90 is coupled to the first end 22 of the drive shaft 18 via an extension portion 92 which has a throughbore 94 for transmitting dust therethrough and comprises threaded portions 96 at either end thereof for coupling to the cutting member 88 and the drive shaft 18. As shown in FIG. 8, the cutting member 88 is coupled to the extension portion 92 and the extension portion 92 is coupled to the drive shaft 18 via a male-to-female thread extension adapters 98. It should be noted that said extension adapters 98 are only required in this instance due to the presence of a tubular member 100, which is more clearly shown in FIG. 9. The tubular member 100 provides an annular path 102 through which dust may pass from the bore 90 of the cutting member 88 via extraction apertures 104 and into the chamber 38 in the drill attachment 10, and subsequently through the fluid conduit 14.

In order to allow transmission of dust from the annular path 102 into the chamber 38 in the drill attachment 10, the tubular member 100 comprises a plurality of apertures 106 in the base thereof adjacent the annular opening 39 in the drill attachment.

Figure 10:
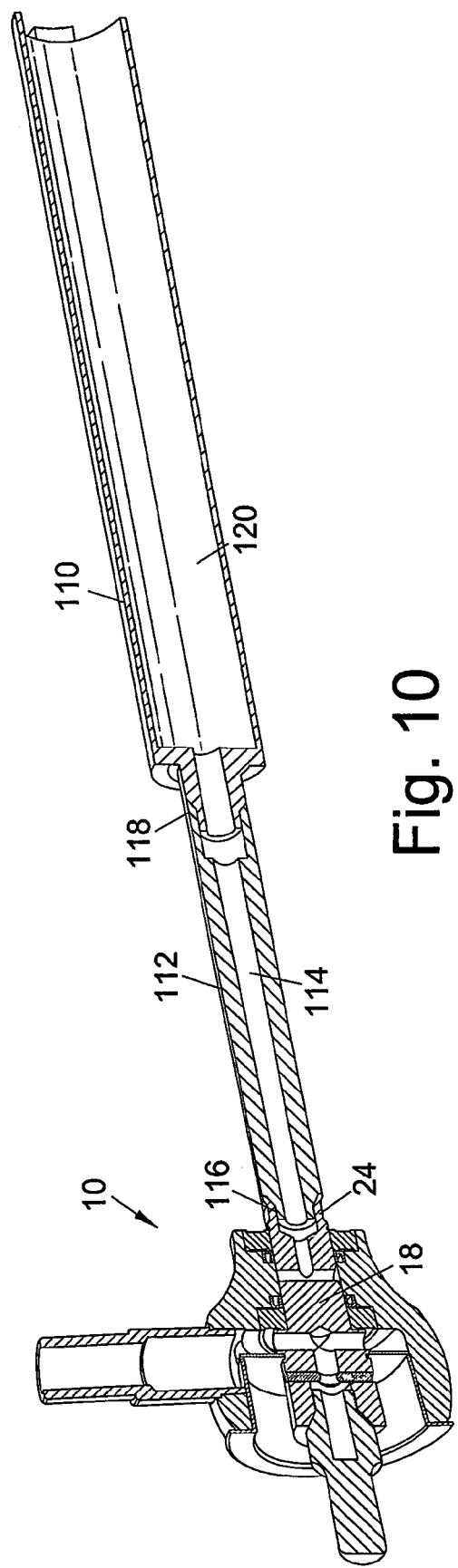
FIGS. 10 to 12 show sectional perspective views of the drill attachment of FIG. 1 in alternative wet drilling arrangements.

Referring to FIG. 10, the drill attachment 10 is shown for use in wet drilling wherein thick wall portions or the like are to be drilled. A tubular cutting member 110 is coupled to the second end 24 of the drive shaft 18 via an extension portion 112 which has a throughbore 114 for transmitting fluid therethrough and comprises threaded portions 116, 118 at either end thereof for coupling to the drive shaft 18 and the cutting member 110 respectively.

Figure 11:
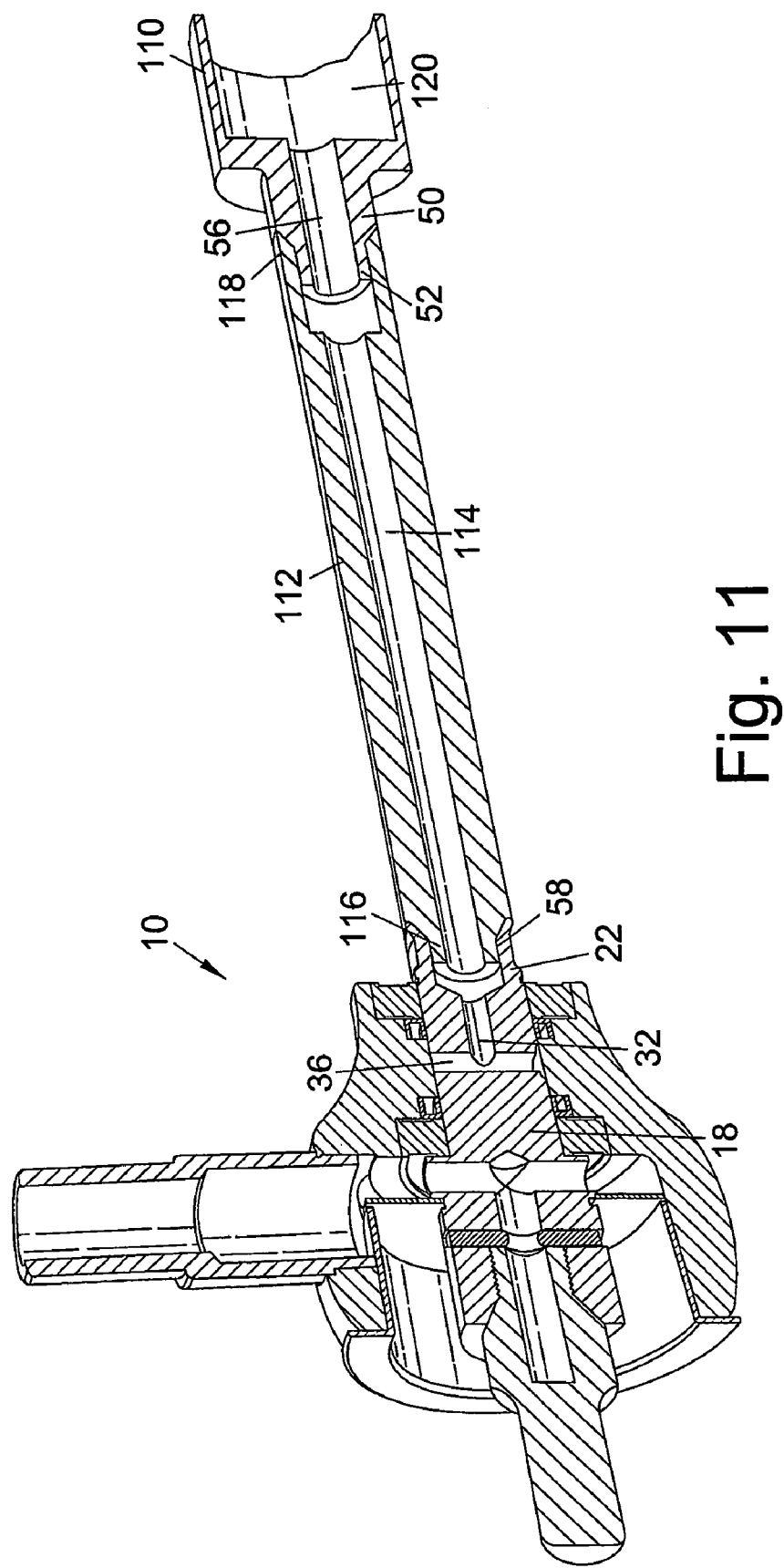

The extension portion 112 is more clearly seen in FIG. 11 where it is shown that threaded portion 116 is a male threaded portion which couples to the female threaded portion 58 of the second end 24 of the drive shaft, and threaded portion 118 is a female threaded portion which receives a male threaded portion 52 provided on a shank portion 50 of the cutting member 110.

Thus, where wet drilling is to be undertaken with the use of an extension member 112, a fluid supply is connected to the second fluid conduit 16 (FIG. 1) and fluid is transmitted through the fluid conduit 116, through the bores 32, 36 in the drive shaft 18, through the throughbore 114 in the extension member 112, through the throughbore 56 in the shank portion 50, and into the bore 120 of the cutting member 110.

Figure 12:
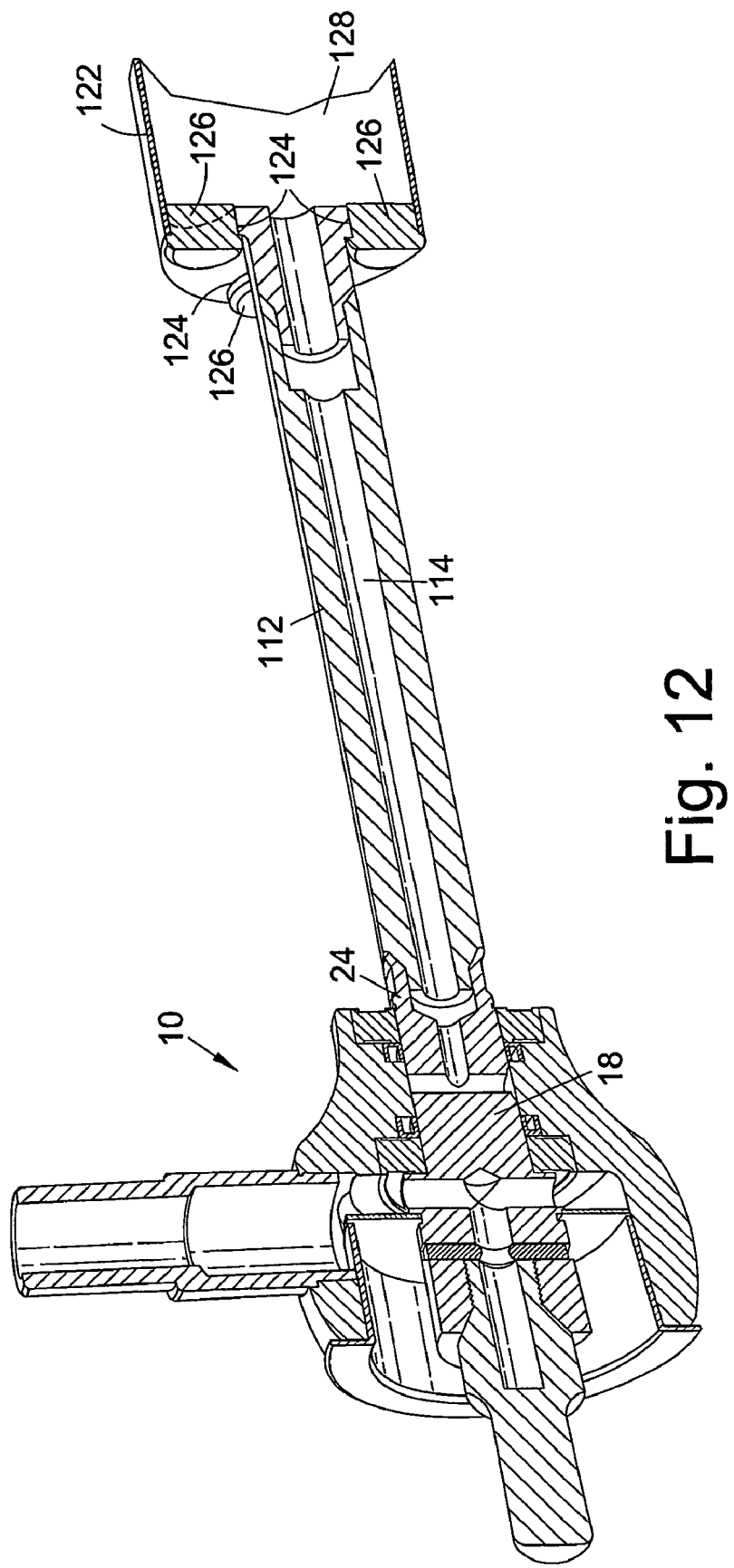

A similar arrangement as that shown in FIGS. 10 and 11 is shown in FIG. 12 in which a larger diameter tubular cutting member 122 is coupled to the second end 24 of the drive shaft 18. In the embodiment shown, the cutting member is coupled to the drill attachment via an 25 extension portion 112. However, it should be noted that the cutting member 122 may be coupled directly to the drive shaft 18 of the drill attachment 10.

The cutting member 122 shown in FIG. 12 comprises extract apertures 124 in the base thereof which have been blocked by a number of individual plugs 126 to prevent drilling fluid from pouring from the bore 128 of the cutting member. The provision of such plugs 126 allows cutting members, such as those shown in FIGS. 6 and 7, to be used in both dry and wet drilling operations, eliminating the requirement for drills dedicated to only one type of drilling.

Figure 13:
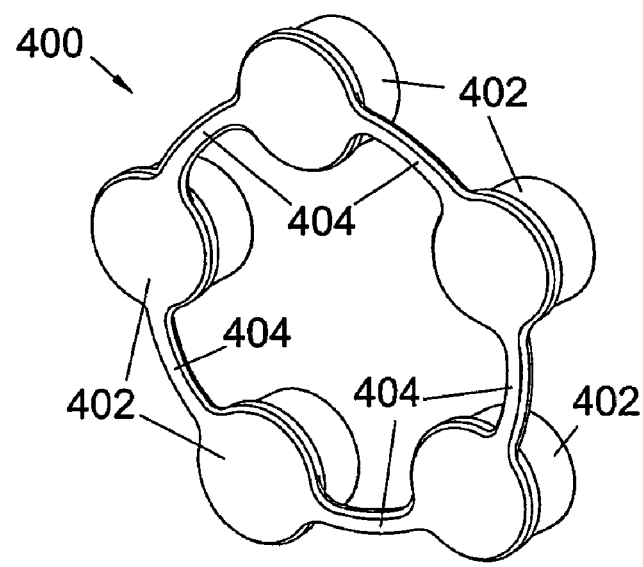
FIG. 13 is a perspective view of a drilling plug arrangement.
Figure 14:
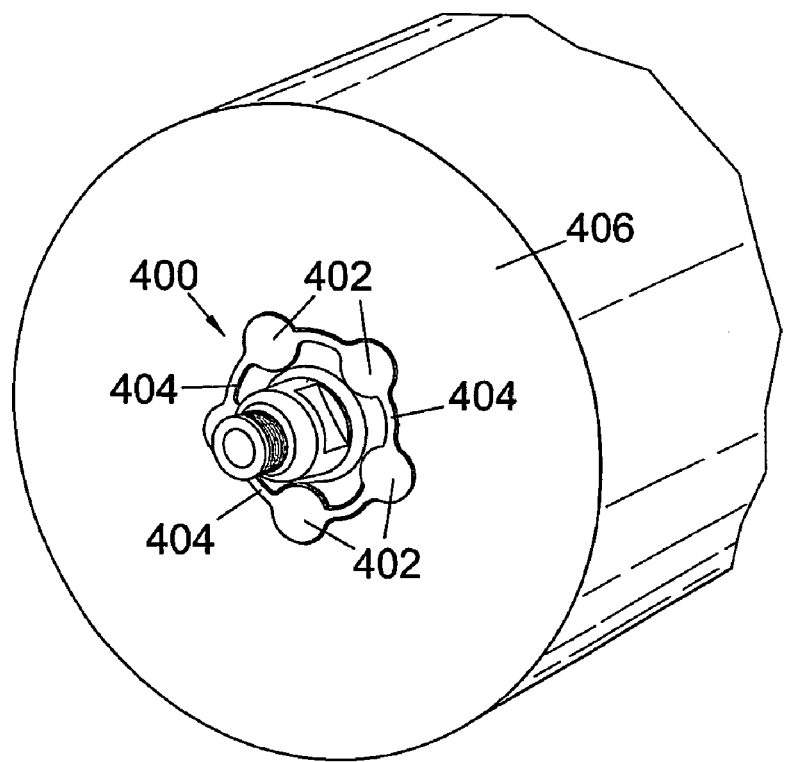
FIG. 14 is a perspective view of the drilling plug arrangement of FIG. 13 shown in use.

An alternative plug arrangement is shown in FIGS. 13 and 14. Referring initially to FIG. 13, a perspective view of a unitary blocking component 400 is shown, which unitary component 400 includes a plurality of plugs 402 joined together by linking members 404. As shown in FIG. 14, the plugs 402 are formed and arranged to be received within a respective extraction aperture of a tubular cutting member 406. The linking members 404 allow the unitary blocking component 400 to be readily removed from the apertures of the tubular cutting member 406 in that they provide a means to be gripped or levered by a tool such as a gripping wrench or a screw driver or the like.

Figure 15:
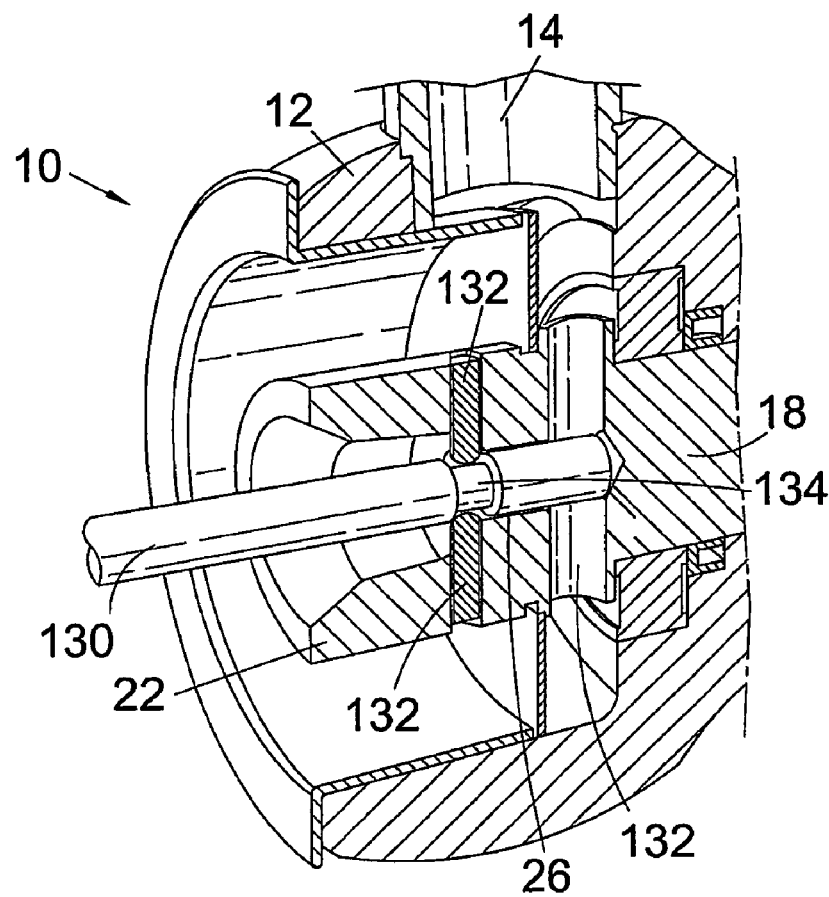
FIG. 15 is an enlarged view of one end of the drill attachment.

Reference is now made to FIG. 15 in which there is shown an enlarged view of the first end 22 of the drive shaft 18 of the drill attachment 10. A pilot drill 130 is shown mounted within the first axial bore 26 of the drive shaft 18. The pilot drill 130 is secured within the first axial bore 26 by two grub screws 132 which extend radially through the drive shaft 18 and grip a portion of reduced diameter 134 on the pilot drill 130.

Access to said grub screws is achieved through the first fluid conduit 14 in the housing 12 of the drill attachment 10.

Figure 16:
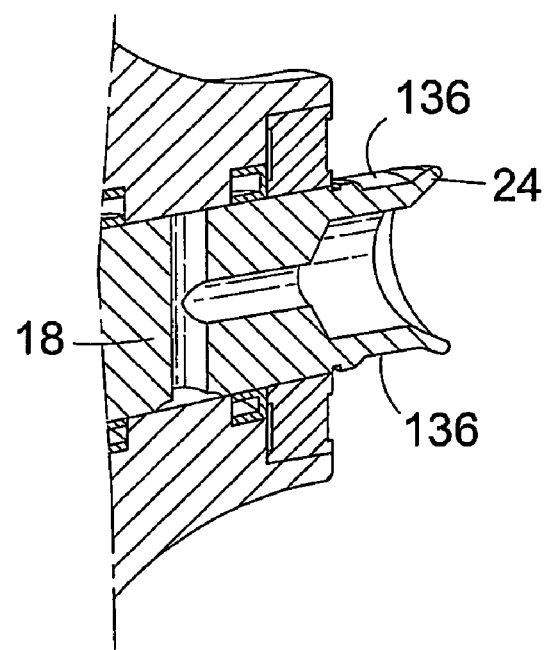
FIG. 16 is an enlarged view of another end of the drill attachment.

Referring now to FIG. 16, there is shown an expanded view of the second end 24 of the drive shaft 18, upon which second end 24 there is provided means for preventing the drive shaft 18 from rotating when tubular cutting member is coupled thereto, such rotation prevention means are in the form of diametrically opposed land portions 136 located on the drive shaft 18 at the second end 24 thereof, said land portions 136 providing gripping means for a tool to restrain the drive shaft 18 from rotational motion. The land portions 136 may be adapted to be gripped by an open mouthed wrench or an adjustable pipe wrench, or the like.

Figure 17A:
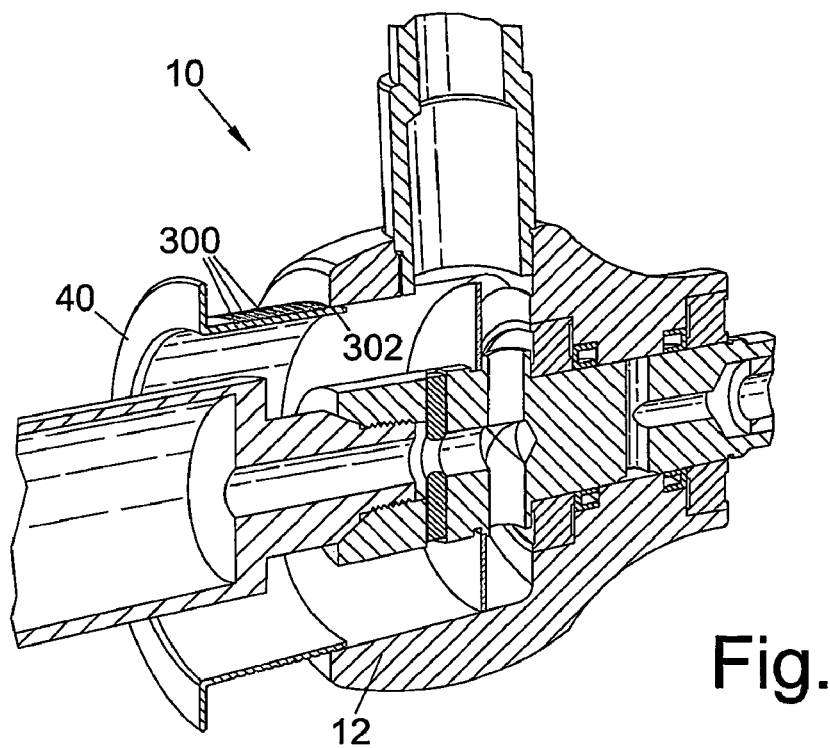
FIGS. 17A, 17B, 18A and 18B are perspective views showing details of a collar portion of the drill attachment.
Figure 17B:
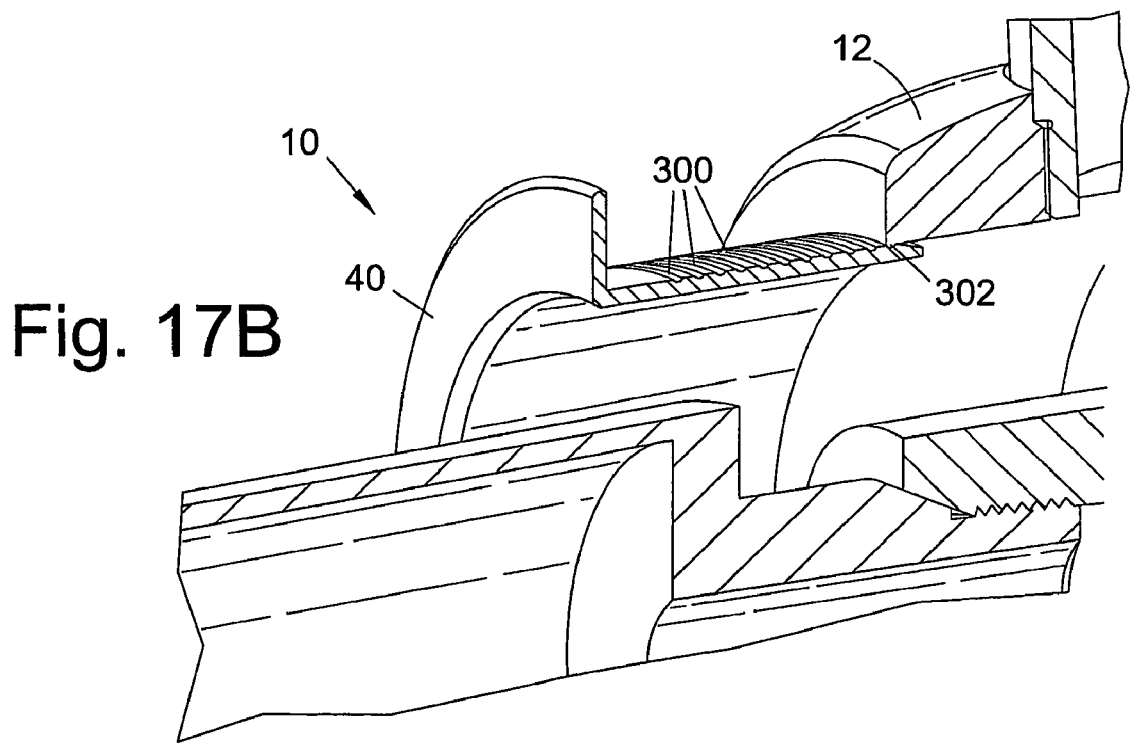

Various features of the collar 40 of the drill attachment 10 in accordance with one embodiment of the present invention will now be described with reference to FIGS. 17A, 17B, 18A and 18B. Referring initially to FIG. 17A, the collar 40 comprises a number of axially arranged circumferential depressions 300, which depressions 300 receive an inwardly extending lip 302 provided on the housing 12 of the drill attachment 10. A more detailed view is shown in FIG. 17B. The purpose of the circumferential depressions 300 and the lip 302 is to retain the collar 40 in the desired position such that the collar 40 cannot inadvertently be pulled from or pushed back into the housing 12 during a drilling operation, at least not without considerable force being applied. Additionally, the presence of the depressions 300 enables the collar 40 to be retained in a range of extended locations in order to accommodate various sizes of tubular cutting members.

Figure 18A:
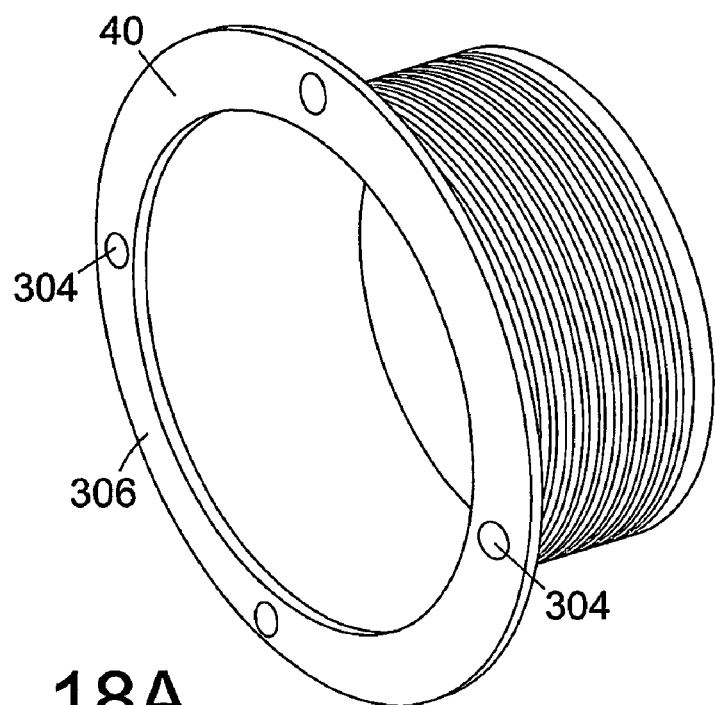
Figure 18B:
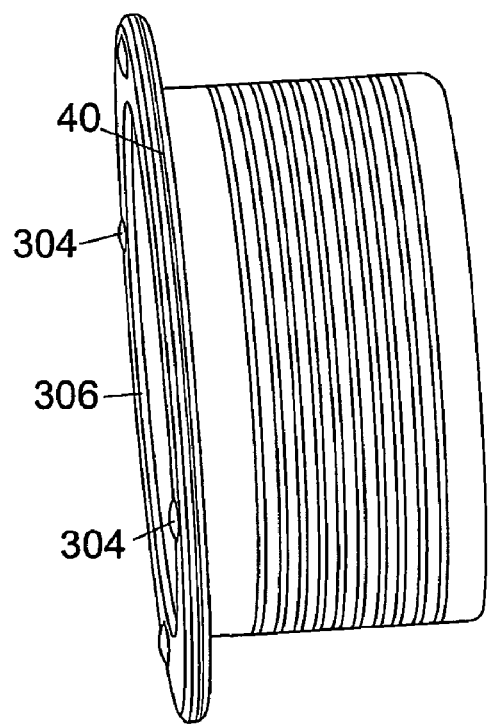

Referring now to FIGS. 18A and 18B, the collar 40 25 includes a plurality of protruding portions 304 which abut the base of a large tubular cutting member during a dry drilling operation in order that wear is restricted to the protruding portions 304 and not the face 306 of the collar 40.

Figure 19:
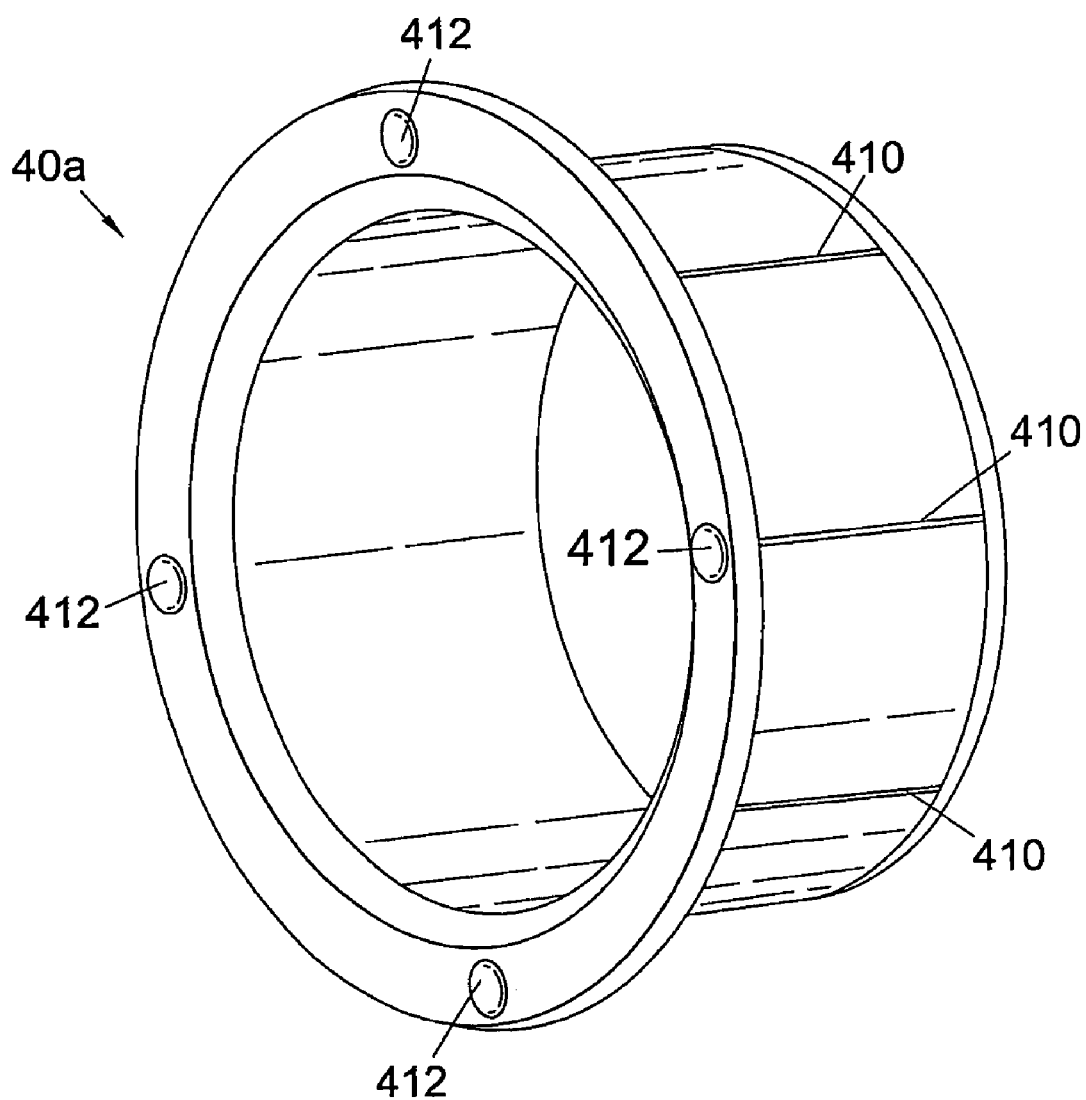
FIG. 19 is a perspective view of a collar portion of the drill attachment in accordance with an alternative embodiment of the present invention.

An alternative embodiment of a drill collar 40a in accordance with the present invention will now be described with reference to FIG. 19. In this embodiment, the collar 40a includes a plurality of longitudinal ribs 410 circumferentially distributed about the outer surface of the collar 40a. Each rib defines a, number of depressions along the length thereof which are adapted to receive the inwardly extending lip 302 (FIGS. 17A and 17B). As with the embodiment shown in FIGS. 18A and 18B, the collar 40a of FIG. 19 also includes a plurality of protruding portions 412.

An alternative embodiment of the present invention will now be described, initially with reference to FIG. 120. A drill attachment 200 for use in wet and dry drilling operations is shown, which drill attachment 200 comprises a housing 202 defining a fluid conduit 204 and a drive shaft 206 rotatably mounted within said housing 202. The drive shaft 206 comprises a fluid transmitting end portion 208 for coupling to a tubular cutting member, and a drive end portion 210 for coupling to a drill unit (not shown), said drive shaft 206 adapted for transmitting rotary motion from the drill unit to the tubular cutting member. The fluid transmitting end portion 208 of the drive shaft 206 is in fluid communication with the fluid conduit 204 via an annular chamber 212 defined between the housing and the drive shaft. The annular chamber 212 has an opening 214 located at the end of the housing 202 adjacent the fluid transmitting end 208 of the drive shaft 206, said opening 214 of the annular chamber being in selective fluid communication with the fluid conduit 204.

Selective fluid communication between the opening 214 of the annular chamber 212 and the fluid conduit 204 is achieved by way of an annular body 216 mounted within said opening 214, said annular body 216 comprising a plurality of fluid apertures 218 which are selectively opened and closed by use of an annular plate 220 rotatably mounted within the housing 202. The annular plate 220 has corresponding fluid apertures 222 which are aligned with those of the annular body 216 to provide fluid communication between the opening 214 and the fluid conduit 204, but which are misaligned with the apertures 218 of the annular body 216 in order to close said apertures 218, and thus prevent fluid communication.

Fluid communication between the fluid transmitting end 208 and the fluid conduit 204 via the chamber 212 is accomplished via an axial bore 224 in the drive shaft which extends from the fluid transmitting end 208, and a diametric bore 226 which extends through the drive shaft 206 and merges with the axial bore 224.

Figure 20:
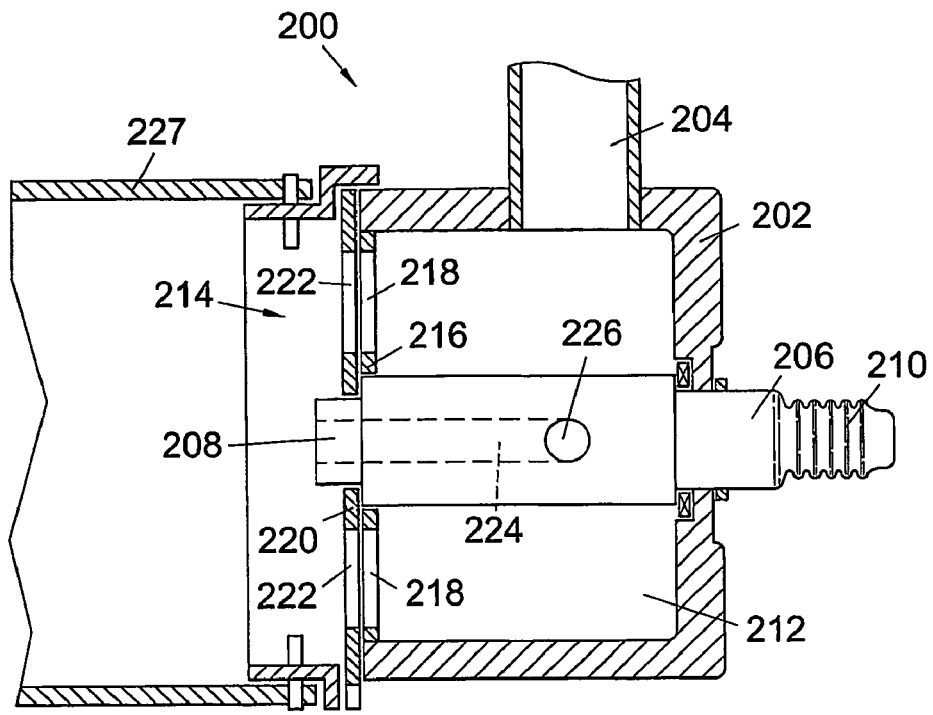
FIGS. 20 and 21 are alternative cross-sectional views of a drill attachment for use in wet and dry drilling operations in accordance with another aspect of the present invention.

Thus, during a dry drilling operation, dust may be extracted from the bore of a tubular cutting member, through the bores 224, 226 in the drive shaft 206, into the annular chamber 212, and through the fluid conduit 204, to which a suction device (not shown) is attached. Additionally, during a dry drilling operation using a large diameter cutting member 227, dust may be extracted from the bore of the cutting member through the opening in 214 of the chamber 212, into the chamber 212, and through the fluid conduit 204, This arrangement is possible when the apertures 218, 220 of the annular body 216 and annular body 220 are aligned, as shown in FIG. 20.

Figure 21:
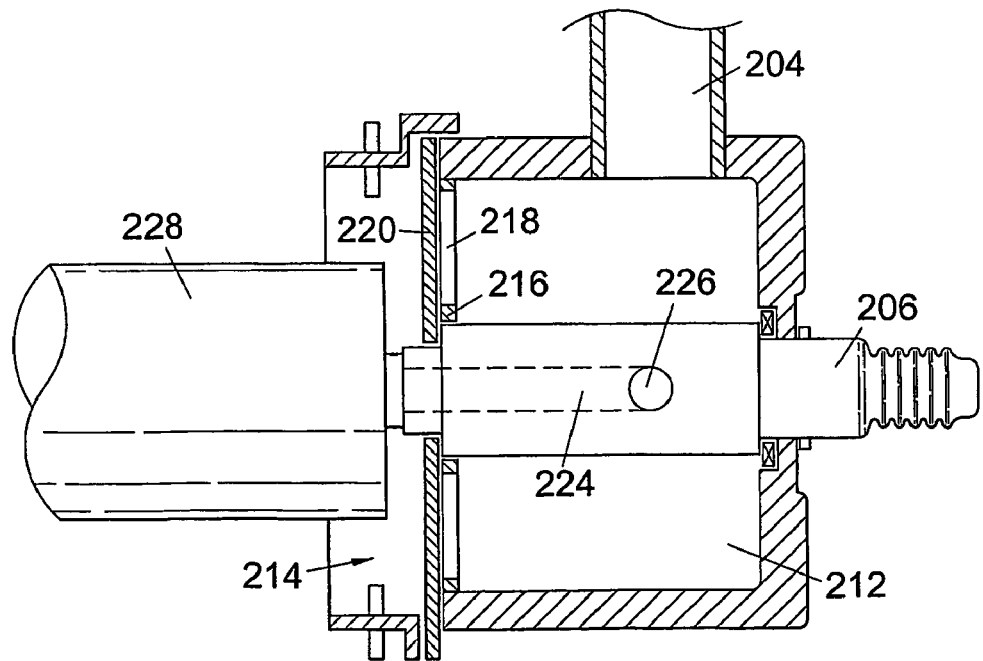

However, during dry drilling with small diameter cutting members, the apertures 218, 222 of the annular body and plate 216, 220 are misaligned, as shown in FIG. 21, such that dust extracted from the bore of a cutting member 228 through the bores 224, 226 of the drive shaft 206 will not escape through the opening 214 of the chamber 212.

Additionally, during a wet drilling operation, the apertures 218, 222 of the annular body and plate 216, 220 respectively are misaligned so that drilling fluid supplied from an external fluid supply into the chamber 212 will not escape through the opening 214 in the chamber 212.

It should be understood that the embodiments hereinbefore described are merely exemplary of the present invention and various modifications may be made thereto without departing from the scope of the invention. For example, in the embodiments shown in FIGS. 1 to 19, each end 22, 24 of the drive shaft 18 may be adapted for transmitting both dust and drilling fluid. Additionally, the drill unit may be directly coupled to the required end of the drive shaft without the requirement for an adapter.

The invention claimed is:

1. A drill attachment for coupling a tubular cutting member having a bore to drive means for rotating the cutting member, the drill attachment comprising: a housing defining first and second fluid conduits; and a drive shaft rotatably mounted within the housing and having fluid transmitting first and second end portions in fluid communication with the respective first and second fluid conduits, the first end portion being adapted for coupling to one of a tubular cutting member and a drive means and the second end portion being adapted for coupling to the other of the tubular cutting member and the drive means; and wherein one of said first and second end portions of the drive shaft is adapted for coupling to a tubular cutting member when dry drilling is required, and the other of said first and second end portions is adapted for coupling to a tubular cutting member when wet drilling is required.

2. A drill attachment as claimed in claim 1, wherein at least one of said first and second end portions of the drive shaft is adapted for coupling to a tubular cutting member when dry drilling is required.

3. A drill attachment as claimed in claim 1, wherein at least one of said first and second end portions of the drive shaft is adapted for coupling to a tubular cutting member when wet drilling is required.

4. A drill attachment as claimed in claim 1, wherein at least one of said first and second end portions of the drive shaft is adapted for transmitting dust extracted from the bore of a tubular cutting member, and at least one of said first and second end portions of the drive shaft is adapted for transmitting an appropriate drilling fluid such as water to the bore of a tubular cutting member.

5. A drill attachment as claimed in claim 1, wherein one of said first and second fluid transmitting end portions of the drive shaft is adapted for transmitting dust extracted from the bore of a tubular cutting member, and the other of said first and second end portions of the drive shaft is adapted for transmitting water or other appropriate drilling fluid to the bore of a tubular cutting member.

6. A drill attachment as claimed in claim 1, wherein when dry drilling is required, a suction device is coupled to one of the first and second fluid conduits in the housing.

7. A drill attachment as claimed in claim 1, wherein when wet drilling is required, a drilling fluid supply is coupled to one of the fluid conduits in the housing.

8. A drill attachment as claimed in claim 1, wherein one of said first and second fluid conduits is adapted for coupling to a suction device, and the other of said first and second fluid conduits is adapted for coupling to a fluid supply.

9. A drill attachment as claimed in claim 1, wherein the drive shaft is bearing mounted within the housing of the drill attachment.

10. A drill attachment as claimed in claim 1, wherein the drive shaft is retained within said housing using circlips.

11. A drill attachment as claimed in claim 1, wherein the drive shaft comprises a first axial bore which extends partially through the drive shaft from the first fluid transmitting end portion thereof, and terminates at a point within the drive shaft.

12. A drill attachment as claimed in claim 11, wherein the drive shaft comprises at least one radial bore which extends from the outer surface of the drive shaft and merges with said first axial bore.

13. A drill attachment as claimed in claim 12, wherein said at least one radial bore merges with the first axial bore in the region of a terminating end of said first axial bore.

14. A drill attachment as claimed in claim 12, wherein two radial bores are provided and are diametrically aligned such that a first diametric bore is defined which extends through the drive shaft in a direction normal to the axial direction of the drive shaft.

15. A drill attachment as claimed in claim 1, wherein one end of a tubular cutting member for use with the drill attachment comprises coupling means for coupling to the drive shaft, and another opposite end of the tubular cutting member comprises cutting elements for effecting drilling.

16. A drill attachment as claimed in claim 15, wherein the coupling means includes threaded coupling means.

17. A drill attachment as claimed in claim 16, wherein the tubular cutting member comprises a male threaded portion which is received within a female threaded portion provided on an end portion of the drive shaft.

18. A drill attachment as claimed in claim 16, wherein the cutting member comprises a female threaded portion which receives a male threaded portion provided at an end portion of the drive shaft.

19. A drill attachment as claimed in claim 15, wherein the coupling means of the tubular cutting member is provided on a shank portion associated therewith.

20. A drill attachment as claimed in claim 19, wherein the shank portion is formed integrally with the cutting member.

21. A drill attachment as claimed in claim 19, wherein the shank portion is independently coupled to the coupling member.

22. A drill attachment as claimed in claim 19, wherein the shank portion includes a throughbore permitting fluid transmission between the bore of the cutting member and one of the first and second fluid conduits in the housing when in use.

23. A drill attachment as claimed in claim 15, wherein large diameter tubular cutting members, particularly those for use in dry drilling operations, have a plurality of extraction apertures in the base thereof, adjacent to the coupling means.

24. A drill attachment as claimed in claim 23, wherein tubular cutting members having a bore diameter greater than around 70 mm comprise dust extraction apertures in the base thereof.

25. A drill attachment as claimed in claim 23, wherein where dust extraction is effected through extraction apertures, the dust is drawn into a chamber in the housing and through one of the first and second fluid conduits.

26. A drill attachment as claimed in claim 25, wherein the chamber is an annular chamber defined between the outer surface of a portion of the drive shaft and the inner surface of a portion of the housing.

27. A drill attachment as claimed in claim 26, wherein the chamber is located within the region surrounding one of said first and second axial bores in the drive shaft.

28. A drill attachment as claimed in claim 25, wherein the chamber is open at one end providing an opening through which dust may be drawn into said chamber.

29. A drill attachment as claimed in claim 28, wherein only one side of the drilling attachment is adapted for dry drilling when large bore cutting members are used and dust is to be extracted through extraction apertures as well as through a shank portion used to couple the cutting member to the drive shaft.

30. A drill attachment as claimed in claim 25, wherein the chamber is located at a first side of the drill attachment and is in fluid communication with the first fluid conduit in the housing.

31. A drill attachment as claimed in claim 25, wherein the chamber is in selective fluid communication with one of the first and second fluid conduits in the housing, such that a fluid path between the chamber and said fluid conduit is open when dust is extracted through extraction apertures.

32. A drill attachment as claimed in claim 1, wherein the drive shaft comprises means for preventing rotation within the housing when a tubular cutting member is coupled thereto using a threaded connection.

33. A drill attachment as claimed in claim 32, wherein the rotation prevention means is in the form of diametrically opposed land portions located at at least one end portion of the drive shaft, said land portions providing gripping means for a tool to restrain the drive shaft from rotational motion.

34. A drill attachment as claimed in claim 1, wherein the drill attachment is adapted for use with a selection of tubular cutting members having various bore diameters.

35. A drill attachment as claimed in claim 34, wherein the drill attachment is adapted for use with cutting members having bore diameters of around 20 to 250 mm and above.

36. A drill attachment as claimed in claim 1, wherein where large diameter tubular cutting members are used, an adapter is provided which comprises the coupling means for coupling to the end portion of the drive shaft, upon which adapter the tubular cutting member is mounted.

37. A drill attachment as claimed in claim 36, wherein the adapter comprises a plurality of radially extending mounting pins which are received within engaging slots provided in the tubular cutting member.

38. A drill attachment as claimed in claim 36, wherein tubular cutting members having a bore diameter greater than around 70 mm are coupled to the drive shaft using an adapter.

39. A drill attachment as claimed in claim 36, wherein the adapter further comprises a plurality of extraction apertures.

40. A drill attachment as claimed in claim 1, wherein the drive shaft has an annular ring mounted on the outer surface thereof, said ring having substantially the same outer diameter as the inner diameter of the portion of the housing defining the chamber.

41. A drill attachment as claimed in claim 40, wherein a chamber is defined in the housing into which chamber dust is drawn through one of the first and second fluid conduits and the annular ring is aligned with the fluid conduit in fluid communication with the chamber.

42. A drill attachment as claimed in claim 41, wherein the ring is aligned along the centre-line of the fluid conduit in fluid communication with the chamber.

43. A drill attachment as claimed in claim 1, wherein tubular cutting members used with the drill attachment may be used in both wet and dry drilling operations.

44. A drill attachment as claimed in claim 43, wherein large diameter tubular cutting members having extraction apertures in the base thereof comprise means for blocking said apertures in order to prevent drilling fluid from pouring from the bore of the cutting member during a wet drilling operation.

45. A drill attachment as claimed in claim 44, wherein said blocking means includes plugs which are fitted within the apertures.

46. A drill attachment as claimed in claim 44, wherein the blocking means includes a unitary component having a plurality of plugs each formed and arranged to be received within a respective extraction aperture.

47. A drill attachment as claimed in claim 46, wherein adjacent plugs of the unitary component may be joined together by a linking member.

48. A drill attachment as claimed in claim 47, wherein the linking members serves to provide a means for removing the plugs of the unitary component from the extraction apertures.

49. A drill attachment as claimed in claim 1, wherein the drilling attachment is adapted to be coupled to a tubular cutting member via an extension portion.

50. A drill attachment as claimed in claim 49, wherein said extension portion comprises an elongate tubular member having a throughbore and including threaded portions at either end thereof for coupling to the drive shaft and a tubular cutting member or appropriate cutting member adapter.

51. A drill attachment as claimed in claim 49, wherein where large diameter cutting members are used in dry drilling operations and dust is to be extracted through extraction apertures, an additional tubular member is provided which surrounds the extension portion and provides an encased path for dust to be drawn from the bore of the cutting member and into the drill attachment housing.

52. A drill attachment as claimed in claim 51, wherein the additional tubular member is coupled to the drill attachment via an appropriate adapter.

53. A drill attachment as claimed in claim 1, wherein means are provided to secure a pilot drill to the drill attachment.

54. A drill attachment as claimed in claim 53, wherein said means for securing a pilot drill to the drill attachment may be provided on the drive shaft at at least one end portion thereof.

55. A drill attachment as claimed in claim 53, wherein the means for securing a pilot drill to the drill attachment comprises at least one grub screw which extends radially through the drive shaft and grips a pilot drill located within one of the first and second axial bores.

56. A drill attachment as claimed in claim 55, wherein where the at least one grub screw extends through the drive shaft at a portion of the shaft which is contained within the housing, access to said at least one grub screw may be achieved through one of the first and second fluid conduits in the housing of the drill attachment.

57. A drill attachment as claimed in claim 1, wherein the drive means is a drill.

58. A drill attachment as claimed in claim 1, wherein the drive means is coupled to the drive shaft by threaded coupling means.

59. A drill attachment as claimed in claim 1, wherein the drive means comprises a male threaded portion which engages a female threaded portion provided on the drive shaft.

60. A drill attachment as claimed in claim 1, wherein the drive means is coupled to the drive shaft via an adapter.

61. A drill attachment as claimed in claim 60, wherein one end of the adapter comprise a male threaded portion adapted to be coupled to the drive shaft, and the opposite end comprises a pin adapted to be received in a chuck of the drive means.

62. A drill attachment for coupling a tubular cutting member having a bore to drive means for rotating the cutting member, the drill attachment comprising: a housing defining first and second fluid conduits; and a drive shaft rotatably mounted within the housing and having fluid transmitting first and second end portions in fluid communication with the respective first and second fluid conduits, the first end portion being adapted for coupling to one of a tubular cutting member and a drive means and the second end portion being adapted for coupling to the other of the tubular cutting member and the drive means; wherein the drive shaft comprises a first axial bore which extends partially through the drive shaft from the first fluid transmitting end portion thereof, and terminates at a point within the drive shaft; and wherein the drive shaft comprises a second axial bore which extends partially through the drive shaft from the second fluid transmitting end portion thereof, and terminates at a point within the drive shaft.

63. A drill attachment as claimed in claim 62, wherein the drive shaft further comprises at least one radial bore which extends from the outer surface of the drive shaft and merges with said second axial bore.

64. A drill attachment as claimed in claim 63, wherein two radial bores are provided and are preferably diametrically aligned such that a second diametric bore is defined which extends through the drive shaft in a direction normal to the axial direction of the drive shaft.

65. A drill attachment as claimed in claim 63, wherein the location of said radial bores along the length of the drive shaft is such that said bores are substantially aligned with said respective first and second fluid conduits in the housing.

66. A drill attachment as claimed in claim 65, wherein one of said first and second axial bores and associated at least one radial bore in the drive shaft is adapted for transmitting dust from the bore of a cutting member to the respective fluid conduit in the housing.

67. A drill attachment as claimed in claim 66, wherein the other of said first and second axial bores and associated at least one radial bore is adapted for transmitting a drilling fluid from the respective fluid conduit in the housing to the bore of a cutting member.

68. A drill attachment as claimed in claim 67, wherein the drive shaft comprises fluid seals located on either side of the at least one radial bore through which drilling fluid may be supplied in order to prevent leakage of said drilling fluid.

69. A drill attachment for coupling a tubular cutting member having a bore to drive means for rotating the cutting member, the drill attachment comprising: a housing defining first and second fluid conduits: and a drive shaft rotatably mounted within the housing and having fluid transmitting first and second end portions in fluid communication with the respective first and second fluid conduits, the first end portion being adapted for coupling to one of a tubular cutting member and a drive means and the second end portion being adapted for coupling to the other of the tubular cutting member and the drive means; wherein where dust extraction is effected through extraction apertures, the dust is drawn into a chamber in the housing and through one of the first and second fluid conduits; wherein the chamber is located at a first side of the drill attachment and is in fluid communication with the first fluid conduit in the housing; and wherein the side of the drilling attachment comprising the chamber is also adapted for use in wet drilling, wherein means are provided for closing the opening through which dust is extracted into the chamber during dry drilling.

70. A drill attachment as claimed in claim 69, wherein such means includes an annular body mounted within the opening, which annular body comprises a plurality of apertures which remain open during dry drilling, but which are closed during wet drilling to prevent leakage of drilling fluid.

71. A drill attachment as claimed in claim 70, wherein the apertures are selectively opened and closed by use of an annular plate mounted on or within said annular body, which annular plate has corresponding apertures which are aligned with those of the annular body during dust extraction, but which are misaligned with the apertures of the annular body, in order to close said apertures, during wet drilling.

72. A drill attachment as claimed in claim 71, wherein a fluid sealing arrangement is provided between the annular body and annular plate in order to maintain sealing integrity and to prevent leakage of the drilling fluid.

73. A drill attachment for coupling a tubular cutting member having a bore to drive means for rotating the cutting member, the drill attachment comprising: a housing defining first and second fluid conduits; and a drive shaft rotatably mounted within the housing and having fluid transmitting first and second end portions in fluid communication with the respective first and second fluid conduits, the first end portion being adapted for coupling to one of a tubular cutting member and a drive means and the second end portion being adapted for coupling to the other of the tubular cutting member and the drive means; wherein where dust extraction is effected through extraction apertures, the dust is drawn into a chamber in the housing and through one of the first and second fluid conduits; wherein the chamber is in selective fluid communication with one of the first and second fluid conduits in the housing, such that a fluid path between the chamber and said fluid conduit is open when dust is extracted through extraction apertures; and wherein selective fluid communication between the chamber and the fluid conduit is achieved by use of a sliding collar provided on the housing.

74. A drill attachment as claimed in claim 73, wherein the sliding collar is provided on the inner surface of the housing at the location of the chamber.

75. A drill attachment as claimed in claim 73, wherein the collar is moveable in an axial direction from a first position where the fluid path is closed, to a second position where the fluid path is open.

76. A drill attachment as claimed in claim 75, wherein when the collar is moved to close the fluid path between the fluid conduit and the chamber, that is, towards a first position, a first end of the collar will abut a side face of the ring, therefore closing a portion of the fluid conduit and consequently said fluid path.

77. A drill attachment as claimed in claim 75, wherein when large diameter cutting members are used in dry drilling operations where dust is extracted through the shank portion and extraction apertures, the collar is extended from the housing towards the second, open position, towards the base of the cutting member, wherein the second end of the collar is substantially aligned with the base of the cutting member.

78. A drill attachment as claimed in claim 75, wherein when small diameter cutting members are used in dry drilling operations where dust is extracted through the throughbore in the shank portion only, the collar is retracted into the housing towards the first position, closing the fluid path between the chamber and the associated fluid conduit.

79. A drill attachment as claimed in claim 73, wherein the collar comprises a plurality of axially arranged circumferential depressions in the outer surface thereof, said depressions adapted to receive an inwardly extending lip provided on the housing.

80. A drill attachment as claimed in claim 79, wherein interaction of the circumferential depressions and the lip acts to retain the collar in the desired position such that the collar cannot inadvertently be pushed into or pulled from the housing during a drilling operation.

81. A drill attachment as claimed in claim 73, wherein the collar includes a plurality of longitudinal ribs circumferentially distributed about the outer surface of the collar, said ribs defining a number of depressions adapted to receive an inwardly extending lip provided on the housing.

* * * * *